United States Patent
Strümpler

(10) Patent No.: US 7,109,560 B2
(45) Date of Patent: Sep. 19, 2006

(54) MICRO-ELECTROMECHANICAL SYSTEM AND METHOD FOR PRODUCTION THEREOF

(75) Inventor: Ralf Strümpler, Erding (DE)

(73) Assignee: ABB Research LTD, Zurich (CH)

( * ) Notice: Subject to any disclaimer, the term of this patent is extended or adjusted under 35 U.S.C. 154(b) by 0 days.

(21) Appl. No.: 10/501,979

(22) PCT Filed: Dec. 23, 2002

(86) PCT No.: PCT/CH02/00722

§ 371 (c)(1),
(2), (4) Date: Dec. 30, 2004

(87) PCT Pub. No.: WO03/060940

PCT Pub. Date: Jul. 24, 2003

(65) Prior Publication Data

US 2005/0093141 A1 May 5, 2005

(30) Foreign Application Priority Data

Jan. 18, 2002 (WO) .................. PCT/US02/01662
Apr. 24, 2002 (EP) ...................... 02405334

(51) Int. Cl.
*H01L 27/14* (2006.01)
(52) U.S. Cl. ...................... 257/414; 257/723
(58) Field of Classification Search .............. 257/414
See application file for complete search history.

(56) References Cited

U.S. PATENT DOCUMENTS

| 5,638,946 A | 6/1997 | Zavracky |
| 5,677,823 A | 10/1997 | Smith |
| 6,057,520 A | 5/2000 | Goodwin-Johansson |
| 6,168,395 B1 | 1/2001 | Quenzer et al. |
| 6,714,169 B1 * | 3/2004 | Chau et al. ............ 343/876 |
| 7,002,139 B1 * | 2/2006 | Stallard et al. ......... 250/239 |

FOREIGN PATENT DOCUMENTS

| DE | 42 05 029 C1 | 2/1993 |
| DE | 197 36 674 C1 | 11/1998 |
| DE | 198 00 189 A1 | 7/1999 |

OTHER PUBLICATIONS

*Qiu et al., A Centrally-Clamped Parallel-Beam Bistable MEMS Mechanism, Proc. Of MEMS 2001, Interlaken Switzerland, Jan. 20-22, 2001, pp. 1-4.
*Taher et al., "On a Tunable Bistable MEMS—Theory and Experiment", Journal of Microelectromechanical Systems, vol. 9, Jun. 2000, pp. 157-170.
*Sun et al., "A Bistable Microrelay Based on Two-Segment Multimorph Cantilever Actuators", IEE Catalong No. 98CH36176, Jan. 25-29, 1998, pp. 1-12.

* cited by examiner

*Primary Examiner*—Thao P. Le
(74) *Attorney, Agent, or Firm*—Buchanan Ingersoll & Rooney PC

(57) ABSTRACT

A micro-electromechanical system comprises a substrate (S) and at least two micro-elements (1, 2) of which a first is bistably switchable. The micro-elements (1, 2) have faces (3a, 4a) facing one another, which are produced by a structuring method and thereby initially have at least one minimal distance from one another characteristic of the structuring method. The first micro-element (1) is then switched to the other stable state (B) whereby the distance between the faces (3a, 4a) facing one another is smaller than the characteristic minimal distance for the structuring method. The micro-electromechanical system can be constructed as an electrostatically actuatable microswitch with improved switchability. Laterally and horizontally operating micro-electromechanical systems with new functionality and current-free closed relays can be implemented.

23 Claims, 14 Drawing Sheets

MICRO-ELECTROMECHANICAL SYSTEM AND METHOD FOR PRODUCTION THEREOF

TECHNICAL FIELD

The invention relates to the field of micro-electromechanical systems, especially
- to a micro-electromechanical system according to the preamble of claim 1 and
- to a method for manufacturing such a micro-electromechanical system according to the preamble of claim 21.

PRIOR ART

Such a micro-electromechanical system (MEMS) forming the preamble of claims 1 and 21 and a corresponding method are known, for example, from DE 198 00 189 A1. A micromechanical switch is described there, which comprises a flat support substrate, a contact piece positioned on the support substrate, a mobile electrode and a counter-electrode fixedly connected to the support substrate. The mobile electrode has a free end and a fixed end connected to the support substrate. The mobile electrode and the counter-electrode have surfaces facing one another. By means of electrostatic forces of attraction between these mutually facing surfaces, the mobile electrode can be bent, that is elastically deformed, such that the free end of the mobile electrode approaches the counter-electrode and thereby also the contact piece until contact occurs between the free end of the mobile electrode and the contact piece. The movement of the free end of the mobile electrode in this case takes place laterally, that is parallel to the flat support substrate.

The electrostatic forces of attraction between the mutually facing surfaces of the mobile electrode and the counter-electrode are produced by applying a voltage between the mobile electrode and the counter-electrode. In order to avoid a short circuit between the mobile electrode and the counter-electrode, stoppers are inserted in the counter-electrode which project over the surface of the counter-electrode facing the mobile electrode and do not lie at the same potential as the counter-electrode. For the same purpose, springs can also be provided, which are attached to the side of the mobile electrode facing away from the counter-electrode and restrict the movement of the mobile electrode in the direction of the counter-electrode. In addition, for the same purpose, the surface of the mobile electrode facing the counter-electrode can also be provided with an electrically insulating layer.

The electrostatic force of attraction F between two parallel surfaces of area A at the distance d on application of a switching voltage U between the two surfaces is given by $$F = \epsilon_0 \cdot A \cdot U^2 / (2d^2)$$

The force thus increases linearly with the area, quadratically with the voltage and inversely proportional to the square of the distance.

The microsystem disclosed in said DE 198 00 189 A1 was produced using a silicon deep etching process on the support substrate. In this case, by applying a mask to said support substrate, material is etched out from the support substrate at the points where the mask is open. Grooves or etching channels which at least have a characteristic minimal width for the etching process are thereby formed.

In order to achieve mobility of the free end of the mobile electrode, a sacrificial layer process is used which separates the free end of the mobile electrode from the support substrate. For this purpose, a sacrificial layer arranged in the support substrate below the mobile parts of the micromechanical switch is selectively removed by an etching process, wherein the sacrificial layer continues to exist at points at which a connection to the substrate is desired such as at the counter-electrode, the fixed contact piece and the fixed end of the mobile electrode.

DE 42 05 029 C1 discloses an electrostatically operated micro-electromechanical relay which operates horizontally. That is, the switching movement of this relay runs substantially perpendicular to a support substrate. A tongue-shaped electrode with contact piece is freely etched from a silicon substrate. The substrate is then applied to a counter-substrate with a counter-electrode and a counter-contact such that the electrode forms a wedge-shaped gap with the counter-electrode. By applying a switching voltage between the electrode and the counter-electrode, these are movable towards one another whereby an electrically conducting connection can be achieved between contact and counter-contact. High contact forces can be achieved by relatively wide electrodes.

DE 197 36 674 C1 also discloses a horizontally-operating micro-electromechanical relay and a method for its production. A movable contact is attached to an anchor tongue affixed to one side of a substrate, which is curved away from the substrate in the rest state. In order to produce a high contact force, this contact interacts with a fixed contact which is also secured to a spring tongue curved away from the substrate. The curvature of the contact is achieved by applying a tensile-stress layer to both contacts. In terms of production technology, it is not easy to achieve a high reproducibility of a curvature of the contacts thus produced and therefore of the contact spacings in the rest state (opened).

U.S. Pat. No. 5,638,946 and U.S. Pat. No. 6,057,520 describe further horizontally operating MEMS switches.

J. Qiu et al., "A Centrally-Clamped Parallel-Beam Bistable MEMS Mechanism", Proc. of MEMS 2001, Interlaken Switzerland, Jan. 20–22, 2001 discloses a bistably switchable micro-electromechanical mechanism. This consists of two parallel spring tongues or membranes suspended on both sides, which describe a cosinusoidal profile. At the centre the spring tongues are interconnected and at their ends they are fixed on a support substrate. This bistable micro-element is produced by means of ion etching and sacrificial layer technology from the silicon support substrate so that the spring tongues are movable laterally and two stable states are displayed. By applying a force directed perpendicular to the spring tongues and parallel to the support substrate, the bistable mechanism can be switched to and fro between the two bistable states wherein the respective end position which is a mirror image of the initial position is finally achieved independently by snapping the mechanism. In order to achieve elastic mobility on the one hand and mechanical stability of the micro-element on the other, the 3 mm long spring tongues are only 10 μm to 20 μm wide but 480 μm high.

Further laterally movable micro-electromechanical mechanisms are described in M. Taher, A. Saif, "On a Tunable Bistable MEMS—Theory and Experiment", Journal of Microelectromechanical Systems, Vol. 9, 157–170 (June 2000).

U.S. Pat. No. 5,677,823 discloses a horizontally-operating electrostatically switchable bistable memory element. A bridge-like movable contact aligned substantially parallel to a support substrate is arranged above a fixed contact fixedly connected to the support substrate. The movable contact is fixed to the support substrate at both its ends whereas at its centre it is arched away from the support substrate (first stable position) or arched towards the support substrate (second stable position). In the second stable position the movable contact and the fixed contact are in contact: the switch is closed. In the first stable position the switch is opened. The bistability of the switch is obtained by mechanical stresses which are incorporated into the movable contact during manufacture of the switch. Two electrodes are also arranged laterally next to the fixed contact below the movable contact. By applying electrical voltages to the movable contact and to these electrodes, contact and electrodes can be electrically charged so that electrostatic forces of attraction or repulsion are produced between them by which means the switch can be switched to and fro between the two stable positions.

Another horizontally operating bistable MEMS mechanism is described in Sun et al., "A Bistable Microrelay Based on Two-Segment Multimorph Cantilever Actuators", IEEE Catalog No. 98CH36176.

DESCRIPTION OF THE INVENTION

It is thus the object of the invention to provide a microelectromechanical system (MEMS) of the type specified initially which makes it possible to achieve a more flexible MEMS design. In particular, an improved switchability and new functionalities should be made possible. This object is solved by an MEMS having the features of claim 1.

Furthermore, it is an object of the invention to provide an improved method for MEMS manufacture. This object is solved by a method having the features of claim 21.

Improved switchability can, for example, mean that a switching process can be triggered at lower switching voltages. New functionalities can, for example, mean realising voltageless closed connections or microrelays with both voltageless open and voltageless closed connections.

The MEMS according to the invention comprises a substrate as well as a first micro-element and a second micro-element, wherein

- the first micro-element and the second micro-element are connected to the substrate,
- the first micro-element has a first face and the second micro-element has a second face, which faces are facing one another and are produced by a structuring process,
- the first micro-element contains a switch section through which it is bistably switchable between an initial position and a working position and
- the distance between the first face and the second face in the working position of the first micro-element is shorter than a minimal distance producible by the structuring method between the first face and the second face.

Thus, a first micro-element switchable between the two stable positions, initial position and working position, is used in conjunction with a second micro-element such that after switching from the initial position to the working position, the first micro-element has a shorter distance from the second micro-element than in the initial position. Both micro-elements are connected to the substrate and produced using a structuring method. Said shorter distance in the working position is, according to the invention, shorter than a minimal distance between the two micro-elements characteristic of the structuring method.

In this way, it is achieved that new degrees of freedom are obtained in the design of MEMS since boundary conditions pre-determined by the process technology are overcome. A wide range of micro-actuators can be implemented anew or simply or in improved form.

In a preferred embodiment of the subject matter of the invention, the second micro-element has a first fixed end fixedly connected to the substrate and a movable part wherein in the working position of the first micro-element the movable part of the second micro-element is movable by electrostatic forces between the first micro-element and the second micro-element from a switch-off position to a switch-on position and wherein the two micro-elements have contact points in the area of the point at which said shorter distance between the two micro-elements exists, and which are constructed as electrically non-conducting. The fact that contact points exist means that said shorter distance is zero.

It is thus made possible to produce electrostatically operating actuators whose electrostatically switchable electrodes (electrode and counter-electrode) contact one another. The small or vanishing electrode gaps thereby achieved have an improved switchability in consequence. It is possible to switch the actuator at very low switching voltages.

In a further advantageous embodiment of the subject matter of the invention, the first micro-element is additionally constructed such that it contains a matched counter-electrode which is matched to the shape of the second micro-element: the matched counter-electrode is shaped such that in the switch-on position of the second micro-element the matched counter-electrode and the second micro-element overlap over a large area in the area of said contact points. In the switch-on position of the second micro-element the matched counter-electrode and the second micro-element thus nestle up to one another. A maximisation of the surfaces between which the electrostatic forces of attraction act is thereby achieved which results in higher electrostatic forces of attraction and thus improved switchability. It is thus possible to switch the actuator at very low switching voltages.

In a further advantageous embodiment said matched counter-electrode additionally comprises a second section which is set back in a step shape with respect to the section of the counter-electrode nestling up to the second micro-element. In the switch-on position of the second micro-element, this second section of the matched counter-electrode and the second micro-element enclose a gap. In this way, a force which the second micro-element can exert in its switch-on position can be tailored and selected to be very large by suitably dimensioning the length, width and height of the gap. The force which can be selected to be large in this fashion can, for example, be a contact force of the second micro-element on one or two electric contacts which contact the second micro-element in its switch-on position whereby a more secure electrical contact can be produced.

In a further preferred embodiment a changeover switch relay is achieved.

In other advantageous embodiments of the subject matter of the invention, relays or changeover switch relays with voltageless closed connections are realised.

In particular, in a preferred embodiment the movable part of the second micro-element is elastically deformable by switching the first micro-element from the initial position into the working position. It is thereby possible to achieve voltageless closed connections.

After the structuring of two micro-elements with mutually facing faces, the method according to the invention includes the switching over of the bistably switchable micro-element. New or improved MEMS such as those specified above can thereby be produced.

Further preferred embodiments are deduced from the dependent claims and the figures.

BRIEF DESCRIPTION OF THE DRAWINGS

The subject matter of the invention is explained in detail subsequently with reference to preferred embodiments which are shown in the appended drawings. In the figures.

The reference numbers used in the drawings and their meaning are listed in summarised form in the reference list. Basically, parts having the same effect are provided with the same reference number in the figures.

WAYS FOR IMPLEMENTING THE INVENTION

Figure 1:
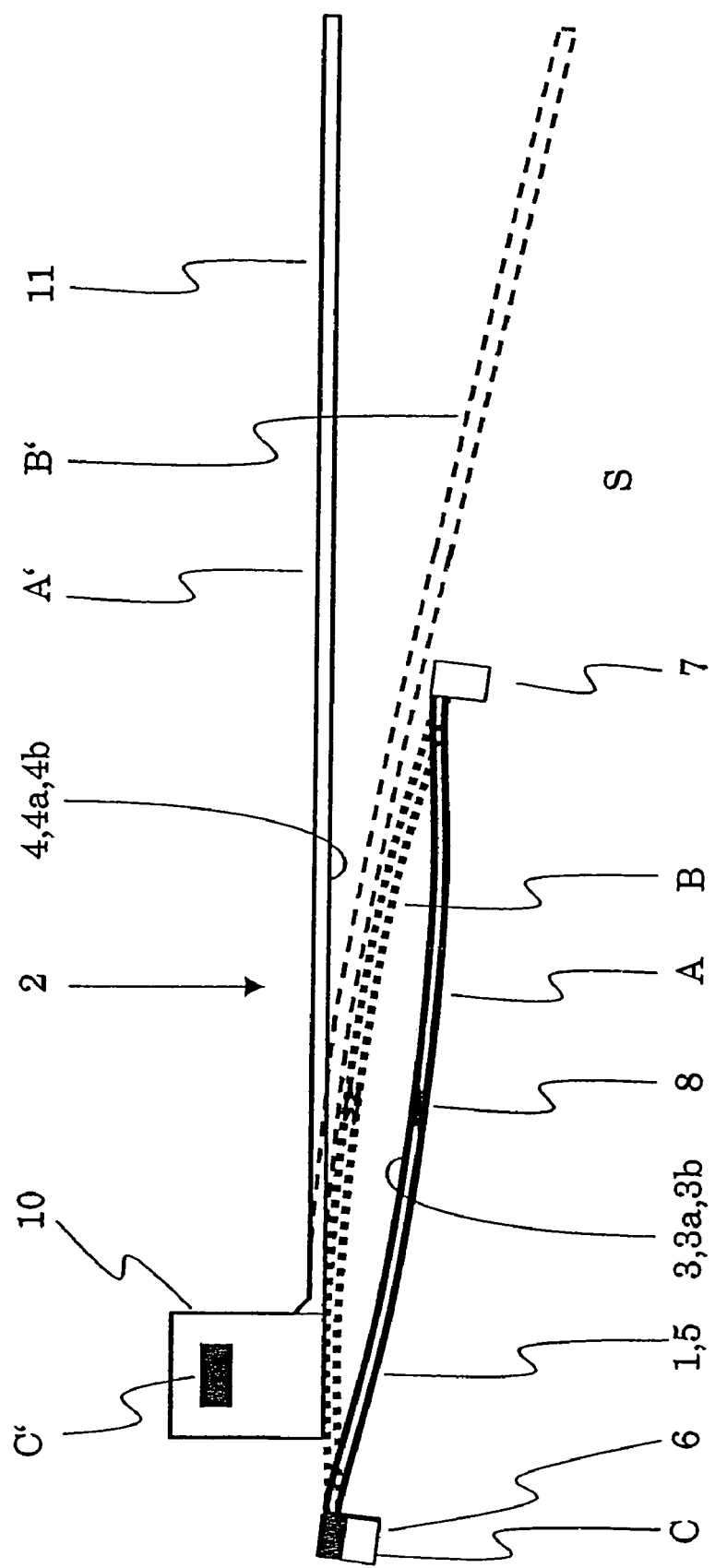
FIG. 1 is a schematic diagram of an MEMS according to the invention with a cosinusoidal bistable element, in plan view.

FIG. 1 shows a schematic plan view of a first micro-electromechanical system (MEMS) according to the invention. It comprises a first micro-element 1 and a second micro-element 2 which are both rigidly connected to a substrate S.

The substrate S is a wafer of single-crystal silicon where one of the two largest surfaces forms the principal surface of the substrate. In FIG. 1 this principal surface lies in the plane of the paper. The first micro-element 1 and the second micro-element 2 were formed from the substrate S by using deep ion etching (DRIE, dry reactive ion etching) and sacrificial layer technology.

The DRIE structuring method has the property of being a material-removing method; it is an etching method. It furthermore has the property of being well suited for producing narrow and deep channels, gaps or grooves whereby a preferential direction can be allocated to the DRIE which specifies the direction of the preferred material removal and thus lies perpendicular to the principal surface of the substrate. The width of a groove produced by means of DRIE is restricted downwards, that is to narrow grooves, again perpendicular to this preferential direction. This means that there is a minimum producible groove width determined by the structuring method (for example DRIE). For the two faces which form the lateral boundaries of such a groove there is thus a minimal distance. Details of how the micro-elements 1,2 can be formed from the substrate by deep ion etching and sacrificial layer technology are known to the person skilled in the art and can be obtained, for example, from said Unexamined Laid-Open Patent Application DE 198 00 189 A1 which is hereby included with its total disclosure content in the description.

Micro-elements produced by DRIE typically have side faces aligned almost perpendicular to the principal surface of the substrate S or expressed differently: (local) surface normal vectors of the side faces run almost parallel to the principal surface of the substrate S. Such micro-elements thus substantially have the shape of a regular (rectangular) prism whose base surface is aligned parallel to the principal surface of the substrate S. In addition, the height of such a micro-element (perpendicular to the principal surface) is typically very large compared with the (narrowest) width of such a micro-element. The first micro-element and the second micro-element are of this type.

The first micro-element 1 is constructed as a bistable elastic MEMS mechanism such as is described in said publication J. Qiu et al., "A Centrally-Clamped Parallel-Beam Bistable MEMS Mechanism", Proc. of MEMS 2001, Interlaken, Switzerland, Jan. 20–22, 2001. Details of embodiments, properties and on the manufacture of such a micro-element can be obtained from this publication which is hereby included in the description with its total disclosure content. The first micro-element 1 is fixed at a first end 6 and a second end 7 on the substrate. In between the first micro-element 1 has two parallel-running cosinusoidally curved spring tongues which are interconnected at the centre 8 between the two ends 6, 7. Considering their small width and their large height (perpendicular to the principal surface of the substrate), these spring tongues can also be considered to be parallel membranes.

The first micro-element 1 is bistably switchable between an initial position A and a working position B (the latter is shown dashed in FIG. 1). That is, the micro-element 1 has two mechanically stable states or positions A and B between which it can be moved to and fro under application of a lateral or substrate-parallel force; in this case, the movement takes place substantially laterally. Any intermediate positions are not stable but independently result in a rapid transition to one of the two stable states A or B. The transition takes place by preferably elastic deformation of the first micro-element 1. Here the first micro-element 1 thus merely consists of a switching section 5 by which it is bistably switchable.

The first micro-element 1 has a side face formed by means of DRIE on the side facing the second micro-element 2, which is designated as first face 3a. This first face 3a has a first coating 3b which is electrically insulating and whose outer surface 3, that is facing away from the first face 3a, forms the first surface 3 of the first micro-element 1. The first coating 3b is typically produced by oxidation of the silicon.

The second micro-element 2 comprises a first fixed end 10 at which it is fixed on the substrate S and a movable part 11; it is arranged adjacent to the first micro-element 1. On that side of the second micro-element facing the first micro-element 1, the second micro-element 2 has a side face formed by means of DRIE which is designated as second face 4a. This second face 4a has a second coating 4b which is electrically insulating and whose outer surface, that is facing away from the second face 4a, forms the second surface 4 of the micro-element 2. The first surface 3 and the second surface 4 are mutually facing surfaces in the same way that the first face 3a and the second face 4a are also facing one another. The second coating 4b is also typically produced by oxidation of the silicon.

After forming the first face 3a and the second face 4a by means of DRIE, the first micro-element 1 is located in the initial position A and the second micro-element 2 in a switch-off position A'. Since the faces 3a and 4a are formed by means of DRIE, they have a distance from one another which is at least as great as a minimal distance determined by DRIE. The distance of the faces from one another means the distance between two such points which lie closest to one another, wherein the one point lies on the first face 3a and the other point lies on the second face 4a. The distance is thus the width of the groove between the first face 3a and the second face 4a at its narrowest point. In FIG. 1 this point is at a corner of the first fixed end 10 of the second micro-element 2 and close to the first end 6 of the first micro-element 1 on the membrane of the first micro-element 1, which has the first face 3a.

The initial position A of the first micro-element 1 is an initial position dependent on the manufacture. The arrangement of the first micro-element 1 and the second micro-element 2 is selected such that after switching the first micro-element 1 from the initial position A into the working position B, the distance of the first face 3a from the second face 4a is smaller than the said minimal distance determined by the manufacturing method (for example, DRIE). In the MEMS in FIG. 1 the distance is even zero, that is in the working position A the first micro-element 1 and the second micro-element 2 are in contact. In the working position A an interaction of the first micro-element 1 with the second micro-element 2 can take place within the MEMS as prescribed.

The MEMS in FIG. 1 is a micro-actuator which is formed by the first micro-element 1 and the second micro-element 2 together with the substrate S. In this case, the second micro-element 2 acts as a movable electrostatically switchable electrode and the bistably switchable first micro-element 1 acts as an electrostatic counter-electrode pertaining thereto. The first micro-element 1 is located in the working position A.

The mode of operation of the micro-actuator when it is in the working position B is substantially known from the prior art: a contacting electrode C is provided at the first fixed end 6 of the first micro-element 1 and a contacting electrode C' is provided at the first fixed end 10 of the second micro-element 2. These contacting electrodes C, C' are used to apply switching voltages to the micro-elements 1, 2 by which the micro-elements are electrostatically charged so that electrostatic forces act between the micro-elements 1 and 2. For this the material from which the micro-elements are made must be sufficiently conductive which is achieved, for example, by suitably doping the silicon. As a result of the electrostatic forces between the micro-elements (more accurately: between the first surface 3 and the second surface 4), the movable part 11 of the second micro-element 2 is movable from the switch-off position A' into the switch-on position B' of the second micro-element 2. The switch-on position B' is shown dashed in FIG. 1. In the MEMS in FIG. 1 an opposite charging of the micro-elements 1, 2 and therefore an attracting electrostatic force is provided. For switching the second micro-element 2 back into the switch-off position A' the charges of the micro-elements 1, 2 are reduced. The non-conducting coatings 3b, 4b ensure that no undesired discharging takes place, especially when the micro-elements 1, 2 are in contact.

As can be deduced from Equation (1), the electrostatic force decreases in inverse proportion to the distance. The MEMS according to the invention from FIG. 1 thus has the major advantage of being switchable at lower switching voltages than would be required for an MEMS whose distance between electrode and counter-electrode is greater than or equal to the minimal distance determined by the structuring method.

The micro-actuator in FIG. 1 can, for example, be used as an optical micro-switch wherein a light beam to be switched is transmitted or interrupted by the movable part 11 of the micro-element 2 depending on whether the second micro-element 2 is in the switch-off position A' or in the switch-on position B'. Equally, it is also possible for a light beam to be deflected with the micro-actuator in FIG. 1, for example, if a reflecting region (not shown) is arranged in the movable part 11 of the second micro-element 2. The switch-on position B' is then present by definition when suitable switching voltages are applied; otherwise, the switch-off position A' is present.

The bistably switchable first micro-element 1 is used as an electrostatic electrode or counter-electrode.

The embodiment in FIG. 1 was described in very great detail. For reasons of clarity and lucidity, some of the details of the mode of operation of the MEMS according to the invention, which have already been mentioned and which should now have become clear to the person skilled in the art, are not specially mentioned again in the following.

Figure 2:
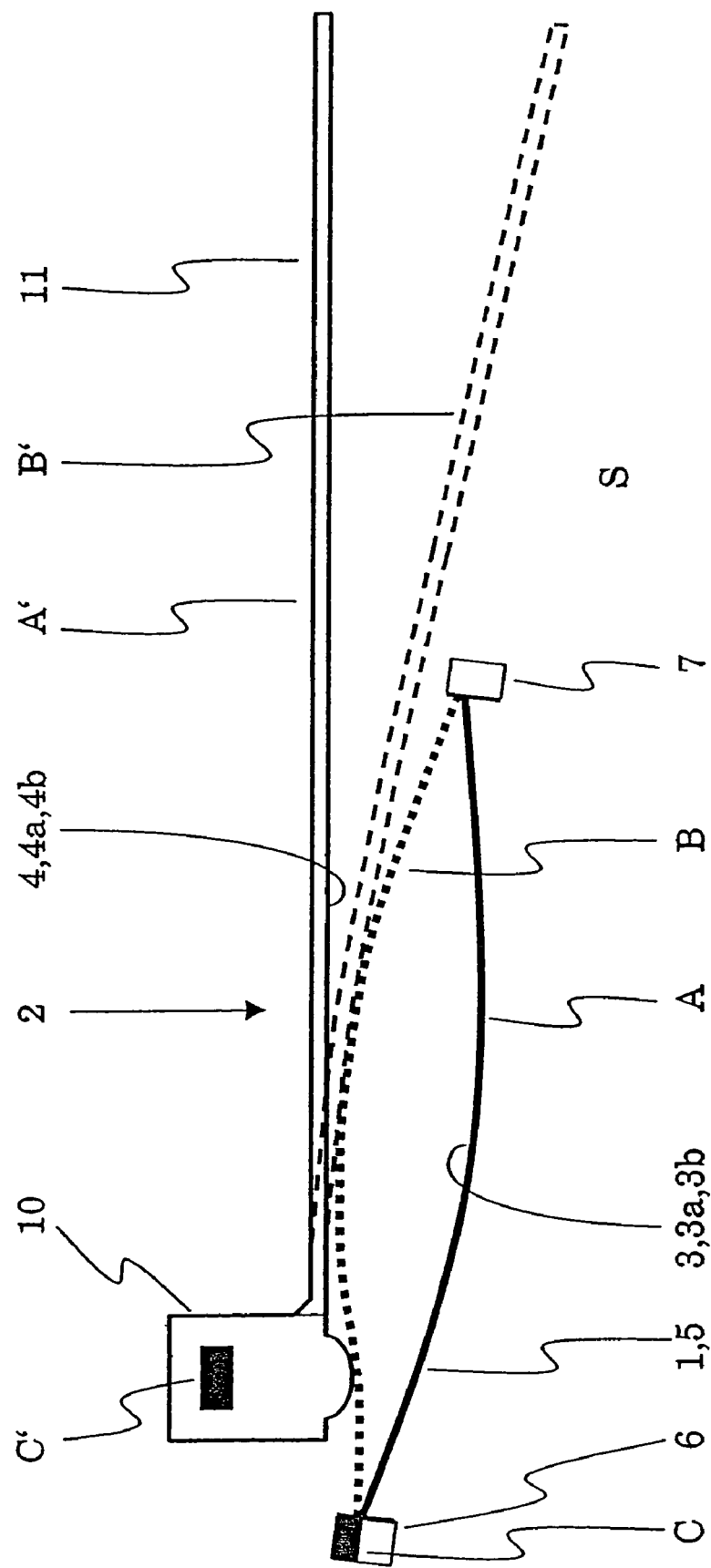
FIG. 2 is a schematic diagram of an MEMS according to the invention with an antinode-shaped bistable element, in plan view.

FIG. 2 shows an MEMS which broadly corresponds to the MEMS from FIG. 1; however, the first micro-element 1 is differently constructed. Here the first micro-element 1 is constructed as another laterally, bistably and preferably elastically switchable mechanism. Here also the first micro-element 1 is fixed at one first end 6 and one second end 7 on the substrates. In between however, the first micro-element 1 has a curved spring tongue which has the shape of an antinode. Considering its small width and its large height (perpendicular to the principal surface of the substrate) this spring tongue can also be designated as a membrane.

In the initial position A, that is in the state in which the first micro-element 1 is structured, the first micro-element 1 describes a symmetric antinode, in the working position B it describes an asymmetric antinode (the latter is shown dashed in FIG. 2). The asymmetric antinode represents the second stable position of the first micro-element 1 and comes about by a stop fixedly connected to the substrate S contacting the first micro-element 1 in the working position B and resulting in corresponding deformation of the first micro-element 1. This stop is formed here by a suitably constructed and arranged first fixed end 10 of the second micro-element 2. The corresponding contact point suitably lies to the right of the connecting section running from the second end 7 to the first end 6 of the first micro-element 1 if the symmetric antinode is arranged in the initial position A to the left of this connecting section. The value of a position coordinate of the contact point drawn parallel to this connecting section is not 0.5 (no asymmetric antinode) and preferably lies between 0.52 and 0.92 of the length of the connecting section; here it is about 0.84. The stop can also be formed by a suitably shaped first end 6 or second end 7 of the first micro-element 1 or as a stop fixed separately on the substrate S (which should then be considered as belonging to the first micro-element 1).

As in the embodiment from FIG. 1, the bistable micro-element 1 is produced in the initial position A (structured), wherein the distance between the first micro-element 1 and the second micro-element 2 is at least as large as a minimal distance (between these micro-elements 1, 2) determined by the structuring method. Still within the scope of the manufacture of the MEMS, after application of coatings 3b, 4b the first micro-element 1 is switched from the initial position A into the working position B wherein in the working position B the distance between the two micro-elements 1, 2 is shorter than the said minimal distance. Thus, two micro-elements are realised in the MEMS with a small distance from one another which cannot be produced by the structuring process (by using the bistable switchability of one of the micro-elements). For further details on the embodiment in FIG. 2, reference is made to that written in connection with FIG. 1.

Figure 3:
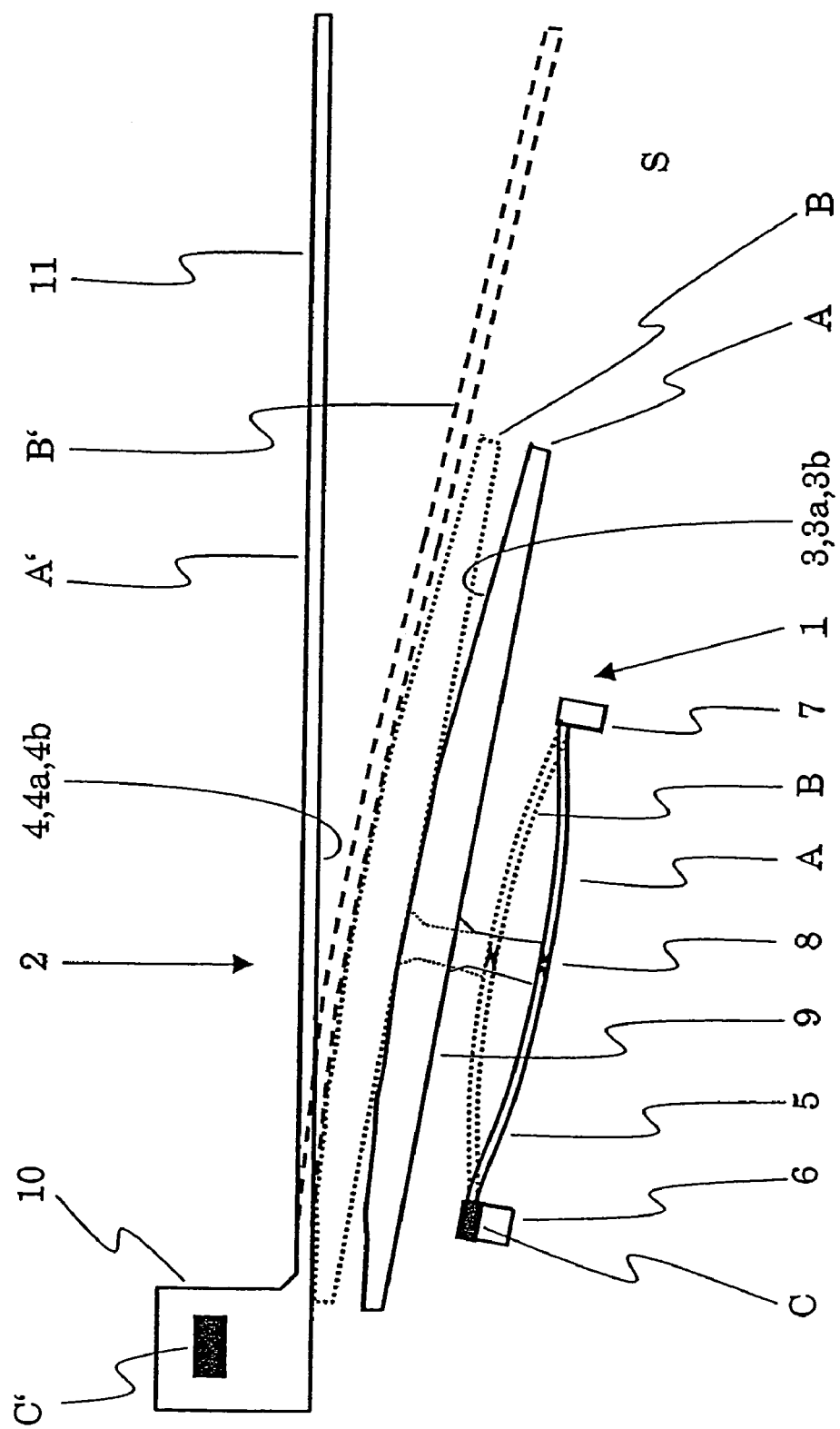
FIG. 3 is a schematic diagram of an MEMS according to the invention with a cosinusoidal bistable element and matched counter-electrode, in plan view.

FIG. 3 shows an MEMS according to the invention which broadly corresponds to the exemplary embodiment shown in FIG. 1; however, the first micro-element 1 here not only comprises a switch section 5 but additionally an electrode 9. The electrode 9 has an elongated section which contains the first face 3a, the first coating 3b and the first surface 3 of the first micro-element 1. This section is connected to the switch section 5 at the centre 8 between the ends 6, 7 of the first micro-element 1 by means of a further elongated section which is aligned approximately perpendicular to said section.

Since the electrode 9 is secured on the switch section 5, it moves with the switch section 5 when switched from the initial position A to the working position B (and back again if necessary). If electrostatic forces of attraction are produced between the first micro-element 1 (naturally in the working position A) and the second micro-element 2 by applying suitable switching voltages, the movable part 11 of the second micro-element 2 becomes elastically deformed and approaches the electrode 9; it is switched from the switch-off position A' to the switch-on position B'. The shape of the electrode 9 and especially the shape of the first surface 3 is preferably formed such that the first surface 3 and the second surface 4 are in full-area contact in the switch-on position. That is to say that there is areal contact between the two surfaces 3, 4 which does not mean that the two surfaces 3, 4 must be completely in contact. The first surface 3 is thus matched to the shape of the second surface 4 in the switch-on position. The two surfaces 3, 4 nestle up to one another in the switch-on position B'. Such an electrode 9 can be designated as a matched electrode 9. The effective area for the electrostatic forces is maximised and the effective distances minimised by the matched electrode 9. Consequently, switching can be achieved at low switching voltage. For further details on the embodiment in FIG. 3, reference is made to that written in connection with FIG. 1.

Figure 4:
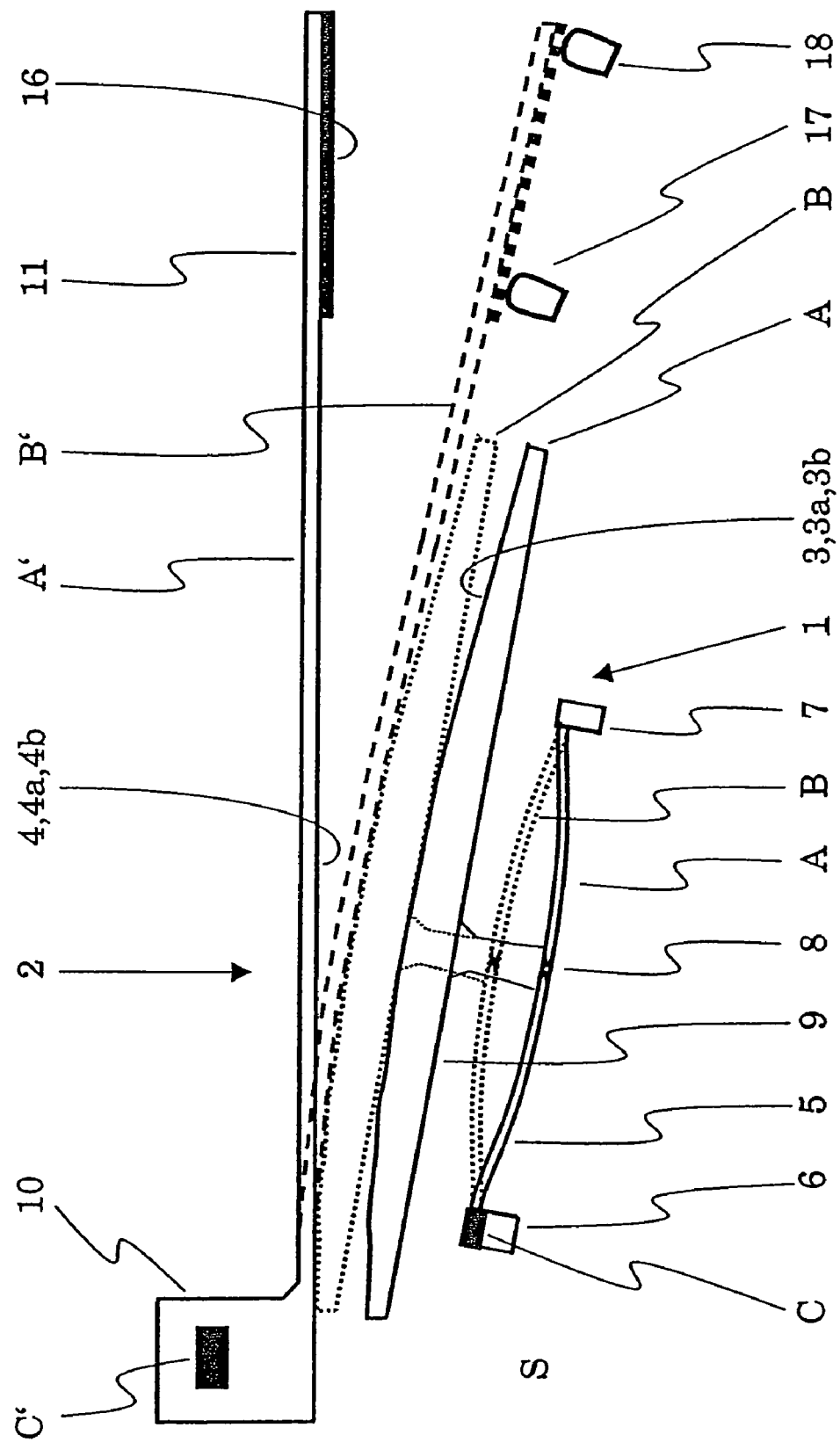
FIG. 4 is a schematic diagram of a microrelay according to the invention with a cosinusoidal bistable element and matched counter-electrode, in plan view.

FIG. 4 shows an MEMS which represents a micro-relay. The exemplary embodiment broadly corresponds to that of FIG. 3. It also comprises a (matched) electrode 9 and a cosinusoidally constructed bistable elastic switchable micro-element 1. In addition, the second micro-element 2, or more accurately: the movable part 11 of the second micro-element 2, has a contact region 16 which is electrically conductive. The contact region 16 is preferably arranged in the area of that end of the movable part 11 of the second micro-element 2 which does not border onto the first fixed end 10 of the second micro-element 2. The contact region 16 forms a part of a side face of the second micro-element 2 and is preferably constructed as a coating which is applied to the second micro-element 2 by means of vapour deposition of sputtering techniques.

Furthermore, the MEMS comprises another two electrically conductive fixed contacts 17, 18 fixed on the substrate S. The arrangement of the fixed contacts 17, 18 and the contact region 16 is selected such that on application of suitable switching voltages to the first micro-element 1 and the second micro-element 2 (that is in the switch-on position B' of the second micro-element 2), the contact region 16 produces an electrically conducting connection between the fixed contact 17 and the fixed contact 18. In the switch-off state A' this is not the case. Thus, an electrostatic micro-relay is provided through which a connection formed by the fixed contacts 17, 18 can be switched by means of the switching voltages.

In this and also in the embodiments discussed further below, it is very advantageous that the distance in the open state between the contact region 16 of the second micro-element 2 and the fixed contacts 17, 18 can be selected and is highly reproducible in terms of production technology.

In FIG. 4 the contact region 16 is arranged on that side of the second micro-element 2 which faces the first micro-element 1, that is on the side containing the surface 4. An electrical contact between the fixed contacts 17, 18 can be accomplished by means of attractive electrostatic forces between the first micro-element 1 and the second micro-element 2.

It is also possible (not shown) to arrange the fixed contacts 17, 18 such that they are located in that region of the substrate S which lies on the side of the second micro-element 2 facing away from the first micro-element 1. The contact region 16 is then accordingly arranged on that side of the movable part 11 of the second micro-element 2 which faces away from the first micro-element 1. Constructed in this way, the relay can be switched by means of repelling electrostatic forces. Naturally, it is also possible to construct this micro-relay or the micro-relay shown in FIG. 4 with (matched) electrode 9 (similar to the structure in FIG. 1).

Figure 5:
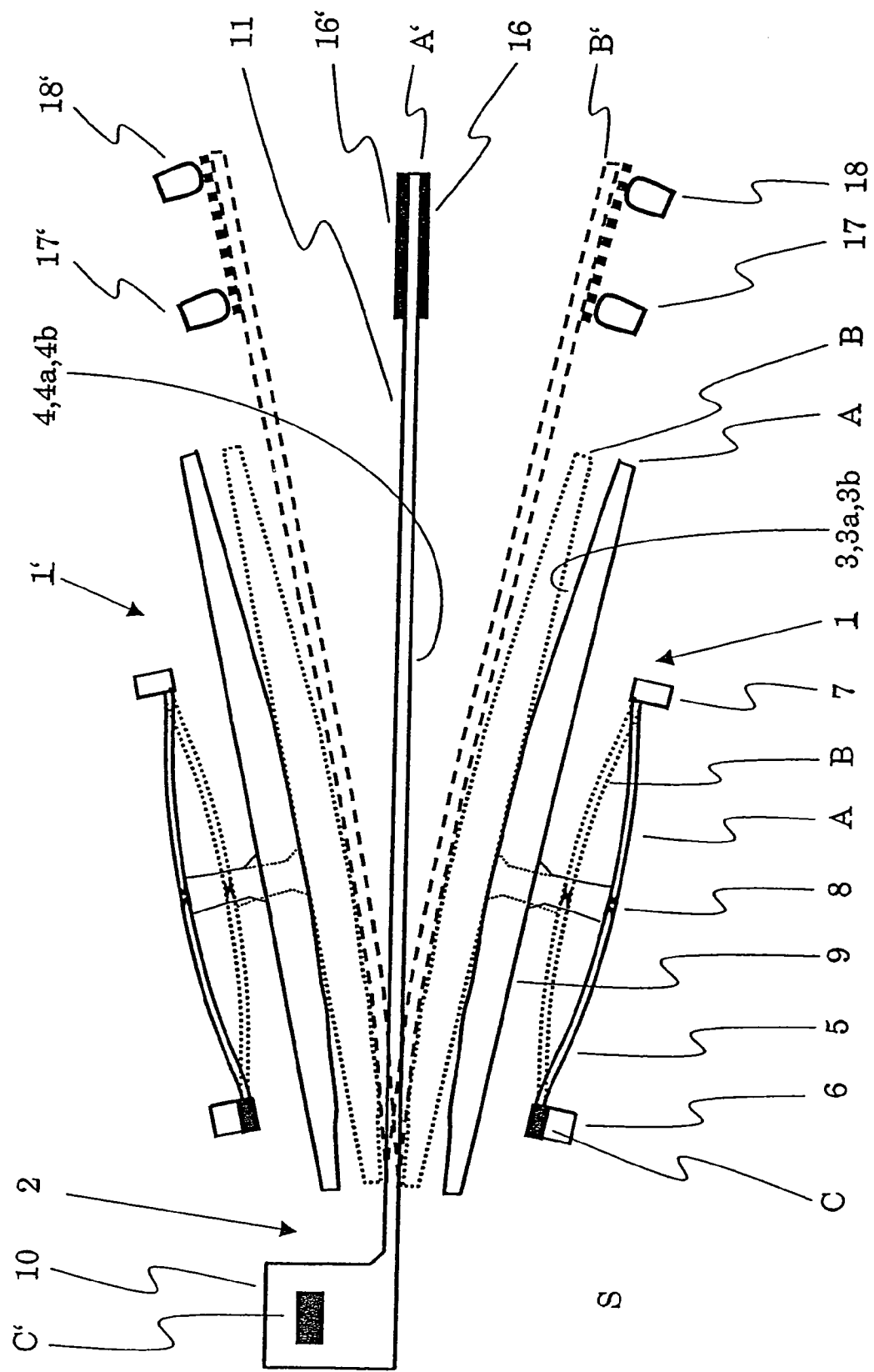
FIG. 5 is a schematic diagram of a micro-changeover switch relay according to the invention with two cosinusoidal bistable elements and matched counter-electrode, in plan view.

FIG. 5 shows a micro-changeover switch relay. This contains all the features of an MEMS such as that described in connection with FIG. 4. In addition however, the MEMS also has a third micro-element 1' and two further fixed contacts 17', 18'; and the second micro-element 2 has a further electrically conductive contact region 16' which is arranged on one side of the movable part 11 of the second micro-element 2 opposite to the side having the contact region 16. The third micro-element 1' and the further fixed contacts 17', 18' are arranged as a mirror image to the first micro-element 1 and the fixed contacts 17, 18 in relation to the elongated movable part 11 of the second micro-element 2. Naturally, the arrangement need not be an exact mirror image; it is sufficient if the third micro-element 1' is connected to the substrate in one area of the substrate S which lies on the side of the second micro-element (2) facing away from the first micro-element 1 and the further fixed contacts 17', 18' are connected to the substrate in an area of the substrate S which lies on the side of the second micro-element 2 facing away from the fixed contacts 17, 18. The structure of the third micro-element 1' corresponds to the structure of the first micro-element 1. The further fixed contacts 17', 18' have the same type of structure as the fixed contacts 17, 18.

The interaction between the third micro-element 1' and the second micro-element (2) and the further fixed contacts (17', 18') corresponds to the interaction between the first micro-element 1 and the second micro-element 2 and the fixed contacts 17, 18 described above. On application of suitable switching voltages to the third micro-element 1' and the second micro-element 2, an electrically conducting connection can be made between the further fixed contacts 17', 18' by the further contact region 16'. Thus, this exemplary embodiment provides a three-position switch or a changeover switch relay which has three defined states: (1.) contacts between both pairs of fixed contacts 17, 18; 17', 18' open, (2.) contacts between the fixed contacts 17', 18' open and contacts between the fixed contacts 17, 18 closed and (3.) contacts between the fixed contacts 17, 18 open and contacts between the further fixed contacts 17', 18' closed.

Figure 6:
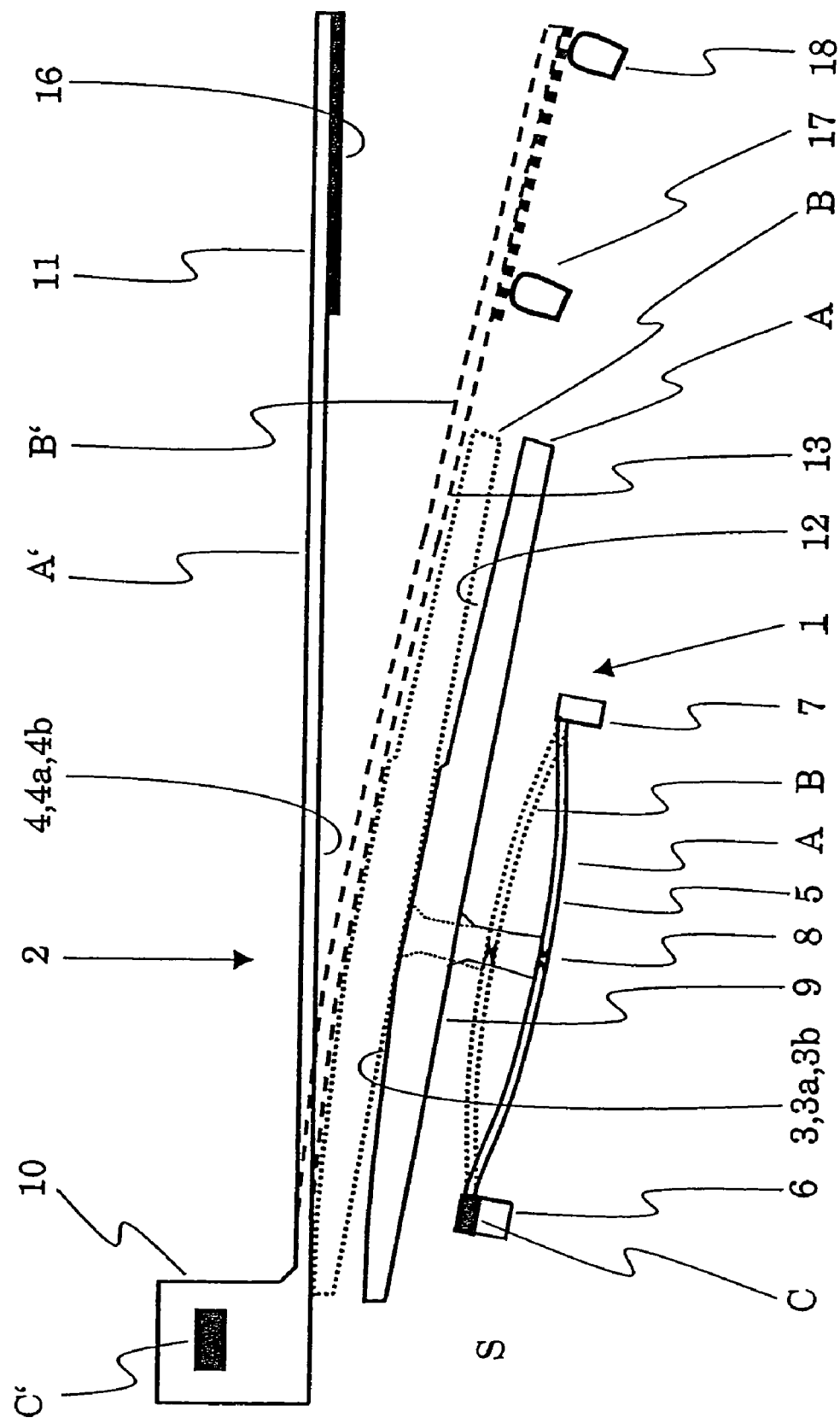
FIG. 6 is a schematic diagram of a microrelay according to the invention with a cosinusoidal bistable element and stepped counter-electrode, in plan view.

FIG. 6 shows a further MEMS according to the invention which broadly corresponds to the MEMS from FIG. 4. It contains the features of the MEMS from FIG. 4 for which reference is made to the corresponding part of the description. However, the electrode 9 of the first micro-element 1 is specially constructed here. The electrode 9 has an (optically step-shaped) recess. The electrode 9 comprises a gap-forming surface 12 which is set back in a step shape with respect to the first surface 3 of the first micro-element 1. This electrode 9 can thus be designated as a stepped electrode 9. In this MEMS attractive electrostatic forces are used for switching from the switch-off position A' to the switch-on position B'. If the first micro-element 1 is located in the working position B and the second micro-element 2 is located in the switch-on position B', the gap-forming surface 12 and the second micro-element 2 or more accurately, the movable part 11 of the second micro-element 2, enclose a gap 13. The magnitude of a contact force exerted by the second micro-element 2 on the fixed contacts 17, 18 can thereby be selected. In particular, a very good, secure contact and a large contact force can thereby be achieved. The choice of the geometry of the gap allows a specific pre-determination and choice of contact force. In particular, for this purpose the length of the gap and the width of the gap (that is the distance between movable part 11 of the second micro-element 2 and the gap-forming surface 12) and if necessary the profile of the gap width can be selected. Typically the length of the gap is about one order of magnitude, preferably about two orders of magnitude greater than the width of the gap. Advantageously, an (approximately) uniformly wide gap is selected and the first surface 3 contacts the second surface 4 over the full area. The relative arrangement of the micro-elements 1, 2 and the fixed contacts 17, 18 on the substrate should be made carefully.

Furthermore, such an MEMS has the advantage that any problems with switching from the switch-on position B' to the switch-off position A' which may arise from slow or poor release of the movable part 11 of the second micro-element 2 from the electrode 9 (that is more accurately: from the first surface 3) as a result of surface effects, for example, can be reduced. The (air) gap 13 allows rapid release of the movable part 11 of the second micro-element 2 from the electrode 9 when switching from the switch-on position B' to the switch-off position A' whilst despite this, in the switch-on position B' large electrostatic forces of attraction act between the first micro-element 1 and the second micro-element 2 if the gap width was selected as suitably small.

Figure 7:
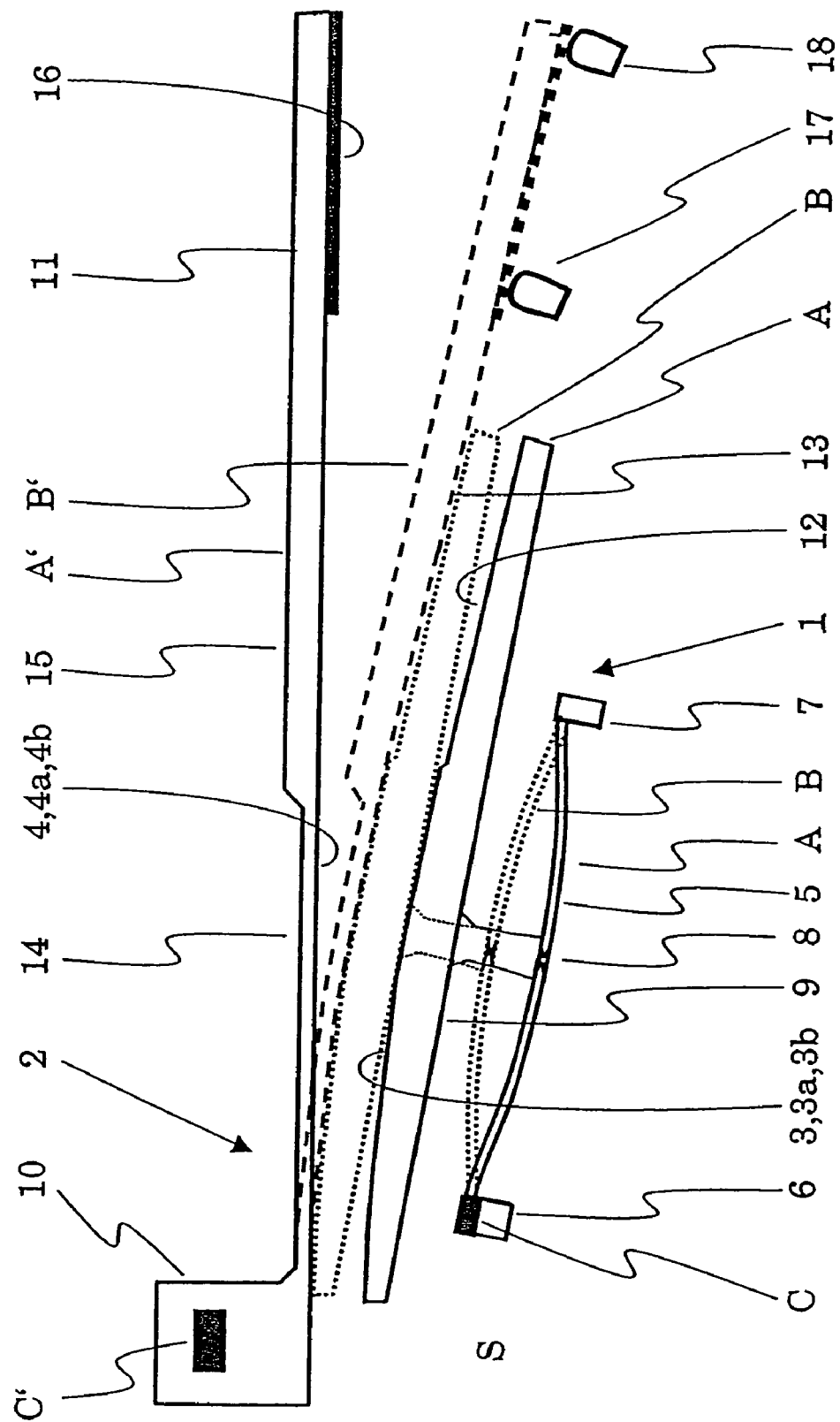
FIG. 7 is a schematic diagram of a microrelay according to the invention with a cosinusoidal bistable element and stepped counter-electrode and two-part movable part of the second micro-element, in plan view.

FIG. 7 shows a further advantageous embodiment of the invention. This largely corresponds to the embodiment shown in FIG. 6 and is described on the basis of this. The movable part 11 of the second micro-element 2 is specially constructed here. This has a first region 14 and a second region 15 wherein the first region 14 is constructed as less rigid, that is more easily deformable than the second region 15. And the first region is arranged between the fixed first end 10 of the second micro-element 2 and the second region 15. The contact region 16 is advantageously arranged in the second region 15, especially in the area of the end of the second region 16 opposite the first region 15. The second region 15 preferably comprises at least that region of the movable part 11 in which the movable part 11 and the second micro-element 2 are not opposite. Particularly advantageous is a (small) overlap of the second region 15 with the region of the movable part 11 in which the movable part 11 and the second micro-element 2 are opposite. In the exemplary embodiment with stepped electrode 9 shown in FIG. 7, the second region 15 advantageously at least also comprises that region of the movable part 11 in which the movable part 11 and the gap-forming surface 12 are opposite. It is especially advantageous in this case if the second region 15 also has a (small) overlap with the first surface 3. Advantageously in the switch-on state B' full-surface contact takes place between the first surface 3 and a part of the second surface 4, this part of the second surface 4 lying completely within the first region 14.

The greater stiffness of the second region 15 compared to the first region 14 is achieved in the exemplary embodiment from FIG. 7 by the second region 15 being constructed as thicker or wider than the first region 14. It is also possible to make the second region 15 more difficult to bend, for example, by applying a coating there; for example, on a base surface of the regular prismatic body forming the region 15 or on at least one of the side surfaces. This could be achieved by means of a suitably (large, long) constructed contact region constructed as a coating.

As a result of the differently stiff regions 14, 15, it is possible to switch the second micro-element 2 from the switch-off position A' to the switch-on position B' at low switching voltages and forces of attraction between the two micro-elements 1, 2; the movable part 11 (more accurately: the first region 14) of the second micro-element 2 nestles up to the electrode 9, by unrolling, even at low forces of attraction on the electrode 9. This is whilst in the second region and preferably in the contact region 16, no- or only slight deformation of the second micro-element 2 is to be expected. In this way, a secure electrical contact can be produced between the fixed contacts 17, 18 by means of the contact region 16.

Said features can naturally also be applied to the exemplary embodiments described further above and further below (FIG. 1 to FIG. 6 and FIG. 8 to FIG. 11b).

Figure 8:
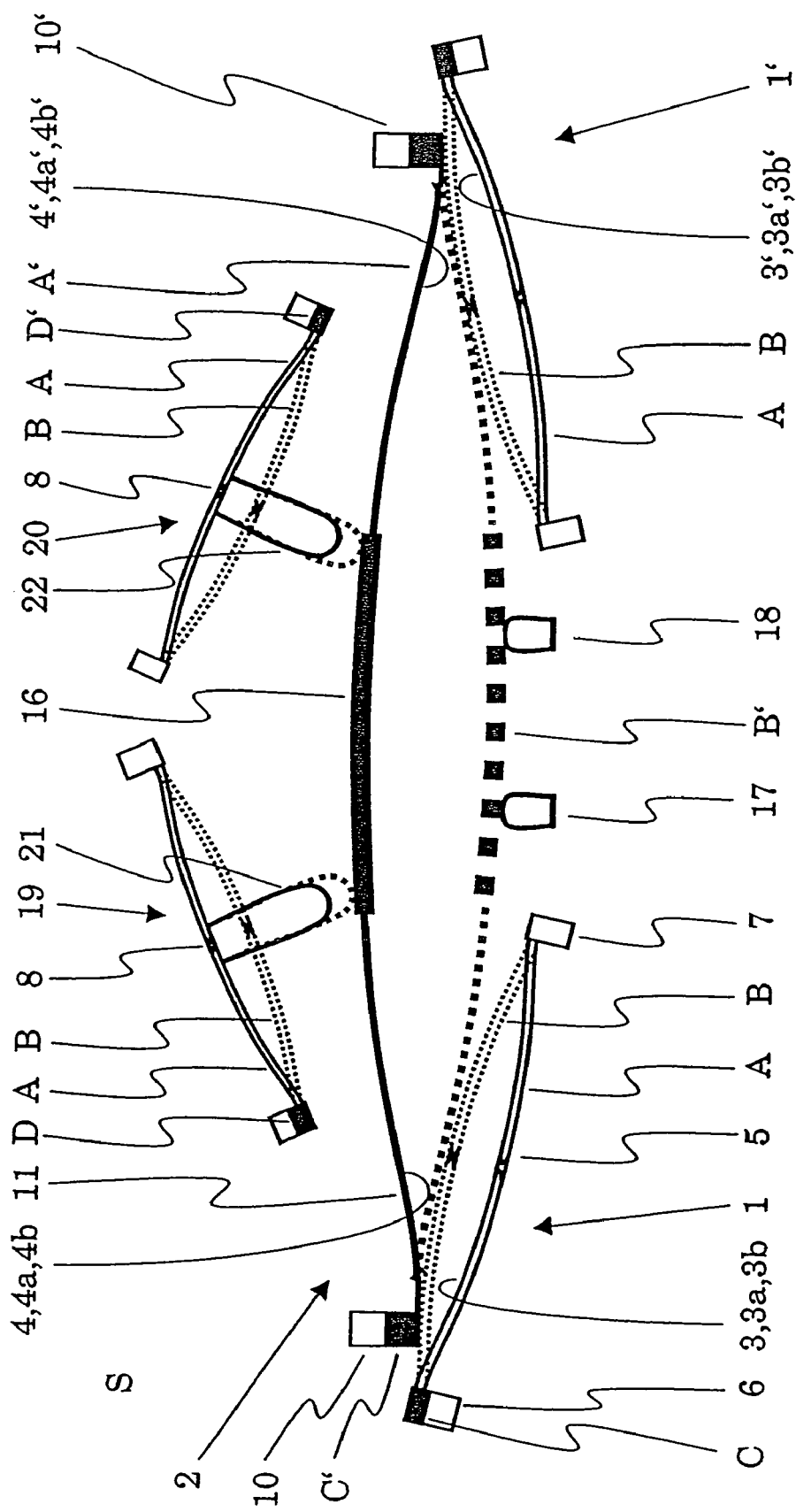
FIG. 8 is a schematic diagram of a changeover switch relay according to the invention with a monostable second micro-element and NO and NC connections, in plan view.

FIG. 8 shows a further advantageous embodiment of the invention, namely a changeover switch relay which, in addition to a normally-open connection (NO connection) also comprises a normally-closed connection (NC connection). NO connection means that in the event of non-application of a suitable switching voltage, the connection is open (voltageless open), as is the case in the exemplary embodiments described above (FIG. 4 to FIG. 7). NC connections which are closed in the event of non-application of a suitable switching voltage (voltageless closed) are difficult to achieve on the other hand but are achieved in this embodiment. In particular, an NC connection in an MEMS structured by means of DRIE is achieved here.

The MEMS in FIG. 8 has a mirror-image structure and comprises a first micro-element 1, a third micro-element 1', a fourth micro-element 19 and a fifth micro-element 20 which are all bistably switchable and have a stable initial position A (shown by the continuous line) and a stable working position B (shown by the dashed line). They are constructed here as bistable micro-elements such as those described more accurately in connection with FIG. 1 (two parallel, cosinusoidal spring tongues connected at their centre). The position in which these micro-elements are structured using DRIE is the initial position A. The first micro-element 1 and the third micro-element 1' broadly correspond to one another in their function. They merely consist of one switch section 5. The fourth micro-element 19 and the fifth micro-element 20 also largely correspond to one another in their function. They each have one contacting electrode D, D' (for applying a signal to be switched, for example, an electric current) and an electrically conductive contact electrode 21, 22. The conductivity of the contact electrodes 21, 22 is preferably produced by a metal coating. The contact electrodes 21, 22 are constructed as elongated, finger-shaped and fixed to the respective micro-element 19, 20 approximately at the centre 8 between the two ends of the respective micro-element 19, 20. Furthermore, the MEMS has another two fixed electrodes 17, 18 fixedly connected to the substrate S (for application of a further electric current to be switched).

The MEMS in FIG. 8 furthermore comprises a second micro-element 2. The second micro-element 2 is a monostably switchable micro-element; it has only one stable position. It comprises a first fixed end 10 and a second fixed end 10' which ends 10, 10' are fixed on the substrate S, and a movable part 11 arranged between these two fixed ends 10, 10'. The movable part 11 is constructed as a bent, preferably antinode-shaped structure which is secured to the two fixed ends 10, 10' of the second micro-element 2 and has an electrically conductive contact region 16. The movable part 11 furthermore has a second surface 4 which is formed by an optional second coating 4b and which second surface 4 faces a first surface 3 of the first micro-element 1. A fourth surface 4' of the second micro-element 2 and a third surface 3' of the third micro-element 1' are in a similar relationship. The second surface 4 is arranged between the first fixed end 10 and the contact region 16. Similarly, the fourth surface 4' is arranged between the second fixed end 10' and the contact region 16. After the structuring of the second micro-element 2, the movable part 11 is located in the switch-off position A', the stable position of the second micro-element 2.

As a result of the existence of the minimal distance already mentioned above between two micro-elements or surfaces produced by means of DRIE, the bistable micro-elements 1, 1', 19, 20 are separated from the second micro-element 2 by at least such a minimal distance. After applying the optional non-conducting coatings 3b, 3b' of the first or third micro-elements 1, 1' and the optional electrically conductive coatings of the contact electrodes 21, 22, the bistable micro-elements 1, 1', 19, 20 are switched from the initial position A to the working position B as part of the method of manufacturing the MEMS according to the invention. As a result, the distance between the micro-elements or surfaces is shorter than said minimal distance; in FIG. 8 the micro-elements are even in contact. In particular, two contact electrodes 21, 22 are in contact with the contact region 16. An electrically conducting connection is thereby produced between the two contact electrodes 21, 22 and thus the NC connection. In this way, a voltageless closed but releasable contact is achieved. The surfaces 3, 4 and the surfaces 3', 4' are respectively also in contact. As a result, by applying relatively low switching voltages between the second micro-element 2 and the first micro-element 1 and between the second micro-element 2 and the third micro-element 1', sufficiently large electrostatic forces of attraction can thereby be produced between the second micro-element 2 and the micro-elements 1, 1' which result in switching of the second micro-element 2 from the switch-off position A' to the switch-on position B'. In the switch-on position B' the NC connection is now open whereas the NO connection is closed. As a result of its monostability, the second micro-element 2 switches itself back into the switch-off position in the event of non-application of a suitable switching voltage: NC connection closed, NO connection open.

Numerous modifications of the embodiment in FIG. 8 are feasible and advantageous: here are some examples:

It is possible to construct the MEMS so that it is not mirror-symmetrical.

The fixed contacts 17, 18 can be dispensed with and an NC-connection micro-relay is then obtained.

The micro-elements 19, 20 can be dispensed with and an NO-connection micro-relay is then obtained.

If the fixed contacts 17, 18 or the micro-elements 19, 20 are dispensed with, it is sufficient if the contact region 16 of the second micro-element 2 is only electrically conductive on one side.

The micro-elements 1, 1' can be provided with (matched, optionally stepped) electrodes 9 (see FIG. 3 to FIG. 7).

The contacting electrodes 21, 22 can be constructed differently; or they can be dispensed with completely and contact is then made with the contact section 16 of the second micro-element 2 by means of the preferably electrically conductive coated switch section.

It is possible to arrange the micro-elements 1, 1' on the other side of the second micro-element 2, that is in the area of the substrate S which lies on the side of the second micro-element 2 facing away from the fixed contacts 17, 18. The micro-relay is then switchable by electrostatic repelling forces.

It is also possible to arrange the first micro-element 1 in a different region (of the substrate S, in relation to the second micro-element 2) compared to the third micro-element 1'.

The third micro-element 1' can be dispensed with and only the first micro-element 1 can be used as electrostatic counter-electrode to the second micro-element 2 as movable electrode.

Said features can be advantageous jointly or individually or in any combination.

Figure 9:
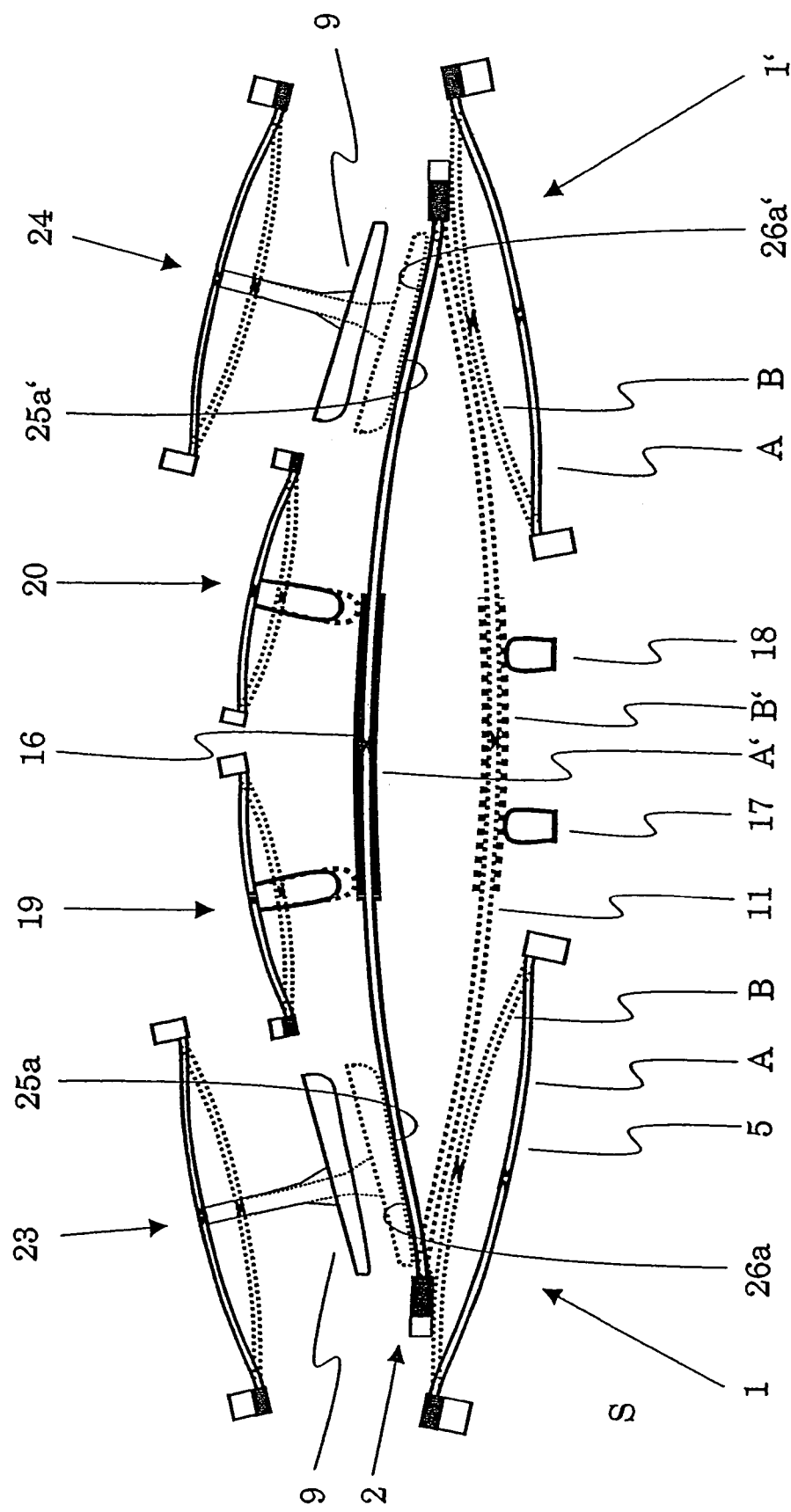
FIG. 9 is a schematic diagram of a changeover switch relay according to the invention with a bistable second micro-element and NO and NC connections, in plan view.

FIG. 9 shows a changeover switch relay which in addition to a normally open connection (NO connection) additionally comprises a normally closed connection (NC connection). The MEMS has a structure very similar to that described in FIG. 8; for corresponding features reference is made to the above text. However, the second micro-element 2 is not monostable but bistable here. In particular, it has a structure with two parallel, cosinusoidal spring tongues connected at their centre as is described in detail in connection with FIG. 1. The two stable positions of the second micro-element 2 are the switch-off position A' and the switch-on position B'. A major advantage of the bistability of the second microelement 2 is that it requires no applied switching voltage to keep the second micro-element 2 in the switch-off position A' or the switch-on position B'. After applying a suitable switching voltage and the switching process to the other state A', B' thereby induced, the second micro-element 2 independently remains in this state A', B'. As a result, each of the two pairs of contacts to which a signal to be switched is applied (fixed electrodes 17, 18 or micro-element 19, 20) can be an NO connection or an NC connection.

In addition, the MEMS in FIG. 9 has two further bistably switchable micro-elements: the sixth micro-element 23 and the seventh micro-element 24. These are also constructed here with two parallel cosinusoidal spring tongues connected at their centre and each have a (matched) electrode 9. They are arranged in the area of the substrate S which lies on that side of the second micro-element 2 facing the micro-elements 1, 1'. The micro-elements 23, 24 interact with the micro-element 2 in a similar fashion to the microelements 1, 1'. For example, for this purpose the second micro-element 2 has a sixth face 26*a* and an eighth face 26*a*' which interact with a fifth face 25*a* (of the sixth microelement 23) or a seventh face 25*a*' (of the seventh microelement 24). By means of electrostatic forces of attraction between the second micro-element 2 and the sixth microelement 23 (more accurately: between the corresponding faces or surfaces) or the seventh micro-element 24 (more accurately: between the corresponding faces or surfaces), the second micro-element 2 can be switched from the switch-on state B' to the switch-off state A'.

A plurality of advantageous modifications of this embodiment are feasible:

It is possible that the MEMS does not have a mirror-symmetrical structure.

The fixed contacts 17, 18 can be dispensed with.

The micro-elements 19, 20 can be dispensed with.

If the fixed contacts 17, 18 or the micro-elements 19, 20 are dispensed with, it is sufficient if the contact region 16 of the second micro-element 2 is only electrically conductive on one side.

The micro-elements 1, 1' can be provided with (matched, optionally stepped) electrodes 9 (see FIG. 3 to FIG. 7).

The micro-elements 23, 24 can be used without matched electrodes 9.

The contacting electrodes of the micro-elements 19, 20 can be constructed differently; or they can be completely dispensed with and then contact the contact section 16 of the second micro-element 2 by means of the preferably electrically conductive coated switch section.

It is possible to switch the micro-relay by electrostatic repulsive forces; or to switch it by means of electrostatic repulsive forces and electrostatic attractive forces.

One, two, or three of the micro-elements 1, 1', 23, 24 can be dispensed with; in particular the micro-elements 1, 24 or the micro-elements 1', 23 located diagonally opposite to one another.

If a switching process is produced by interaction of at least two micro-elements 1, 1', 23, 24 with the second micro-element 2, it is especially advantageous if at least one of the corresponding switching voltages is applied with a time delay relative to at least one of the other switching voltages. The movement that the movable part 11 of the second micro-element 2 makes during the switching process can thereby be supported. In particular, the asymmetric movement of the two parallel, cosinusoidally curved spring tongues of the second micro-element 2 can be taken into account. Suitably matched time switching voltage profiles can also be used.

If instead of a cosinusoidal bistable second micro-element 2, an antinode-shaped micro-element is used, the fixed contacts 17, 18 or the fourth and/or fifth micro-element 19, 20 are advantageously arranged such that at least one of these provides for the asymmetric construction of the antinode.

Said features can be advantageous jointly or individually or in any combination.

Figure 10A:
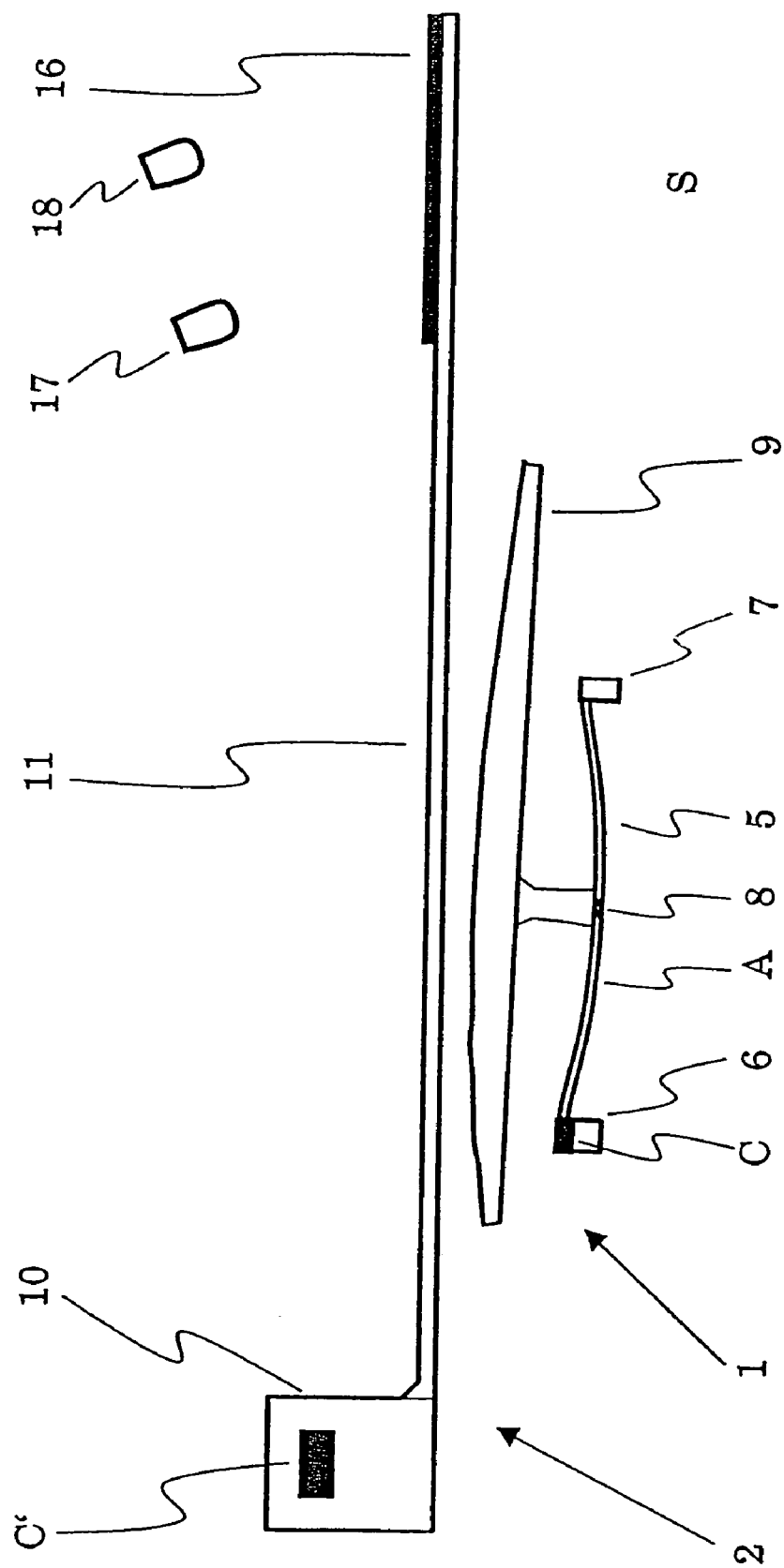
FIG. 10a is a schematic diagram of a microrelay according to the invention with NC connection, state: first micro-element in initial position; in plan view.
Figure 10B:
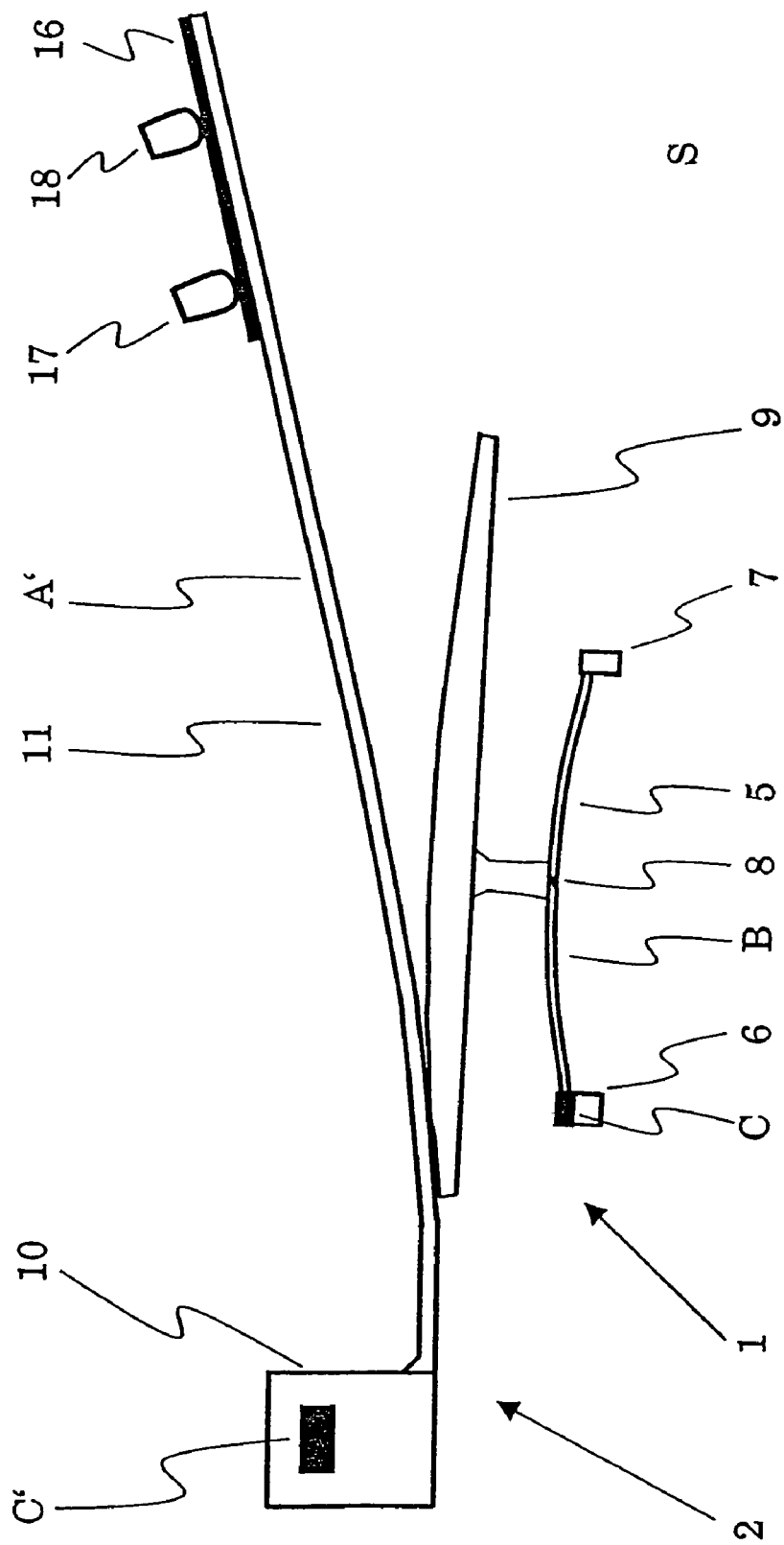
FIG. 10b is a schematic diagram of a microrelay according to the invention with NC connection, state: first micro-element in working position, second micro-element in switch-off position; in plan view.
Figure 10C:
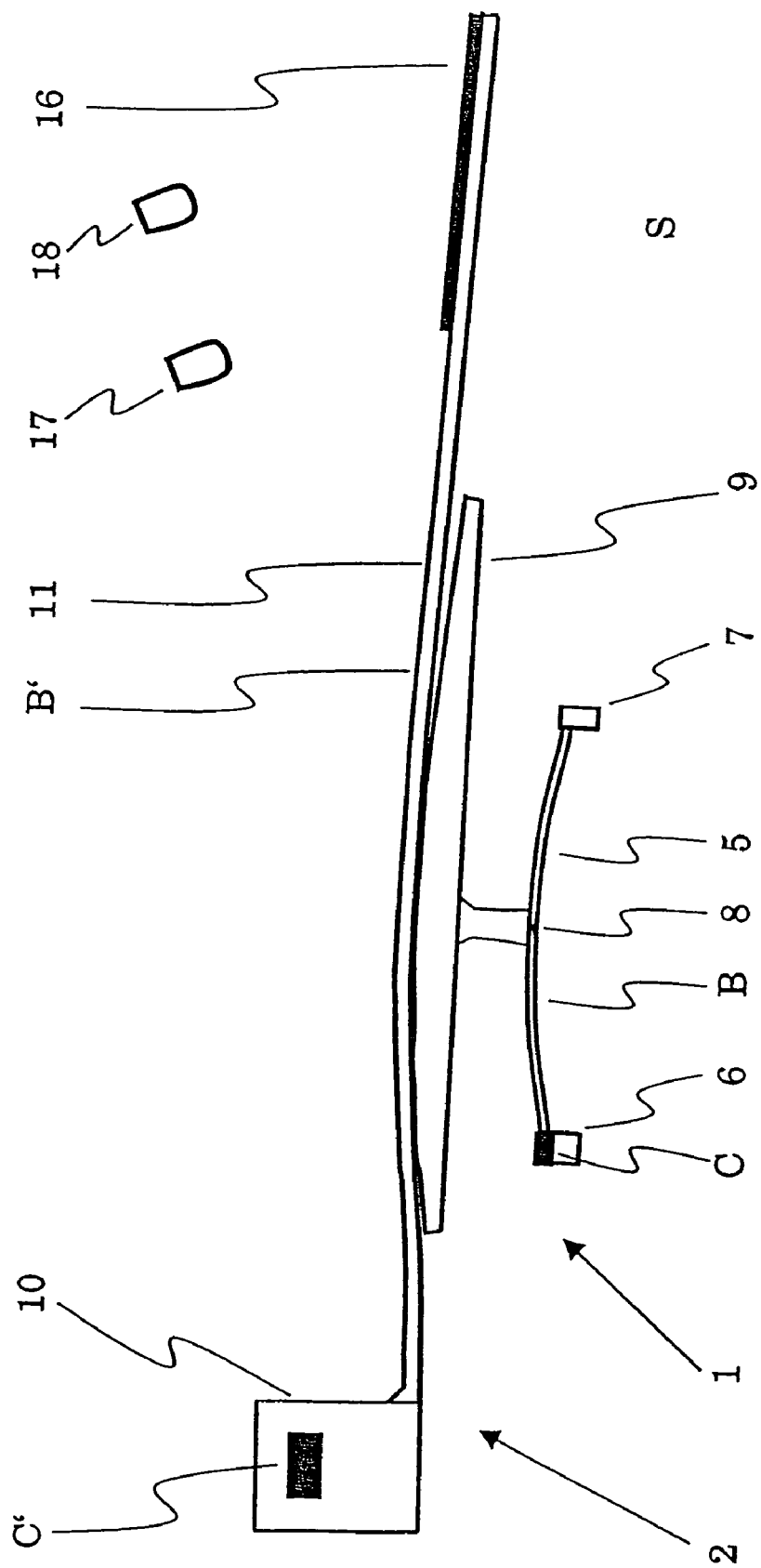
FIG. 10c is a schematic diagram of a microrelay according to the invention with NC connection, state: first micro-element in working position, second micro-element in switch-on position; in plan view.

FIGS. 10*a* to 10*c* show a further advantageous embodiment of the invention in various positions. This MEMS comprises a micro-relay with an NC connection which can generally only be achieved with difficulty. The MEMS is described starting from the exemplary embodiment in FIG. 4 since this has the same components. FIG. 10*a* shows the MEMS in the state which it has after structuring by means of DRIE: the first micro-element 1 is located in the initial position A. FIG. 10*b* shows the MEMS in a state where the first micro-element 1 is located in the working position B and the second micro-element 2 is in the switch-off state A'. FIG. 10*c* shows the MEMS in a state in which the first micro-element is in the working position B and the second micro-element 2 is in the switch-on state B'.

Unlike the embodiments discussed further above, here it is the case that after switching over from the initial position A to the working position B, the first micro-element 1 not only simply comes nearer to the second micro-element 2 than the minimal distance determined by DRIE and merely (lightly) contacts the second micro-element 2. Rather, the arrangement of the micro-elements 1, 2 on the substrate S and the configuration of the micro-elements 1, 2 is selected here such that the first micro-element 1 in the working position B exerts a force on the movable part 11 of the second micro-element 2 which results in a (significant) elastic deformation of the movable part 11 of the second micro-element 2 (see FIG. 10*b*). The movable part 11 of the second micro-element 2 is deformed such that the electrically conductive contact region 16 of the second microelement 2 connects the fixed contacts 17, 18 in a conducting fashion: the NC connection is closed. A voltageless closed but releasable contact is achieved in an MEMS structured using DRIE. Expressed differently: a switching process of the second micro-element 2 is induced by the switching of the first micro-element 1 from the initial position A to the working position B. Since no switching voltage needs to be applied for this, after the switching process the second micro-element 2 is in the switch-off position A'. In order to open the NC connection again, a suitable switching voltage must be applied between the first micro-element 1 and the second micro-element 2. The NC connection is opened by means of electrostatic forces of attraction and the second micro-element 2 goes into the switch-on state B' (see FIG. 10*c*).

On the basis of FIGS. 10*a*–10*c*, further advantageous embodiments can be created in combination with features specified further above. In particular, the electrode 9 can be dispensed with. Or the electrode 9 can be constructed differently. In particular, the electrode 9 can be advantageously constructed and the micro-elements 1, 2 arranged with respect to one another such that the contact points between the two micro-elements 1, 2 (when the first micro-element 1 is in the working position A and the second micro-element 2 is in the switch-off position A') lies substantially on a straight line with the centre 8 in the initial position A and the centre 8 in the working position. A low mechanical loading of the first micro-element 1 can thereby be achieved wherein at the same time large contact forces can be exerted on the fixed contacts 17, 18 (secure contacts).

It is also advantageous, by analogy with the embodiment shown in FIG. 5, to provide a second pair of fixed contacts 17', 18' (not shown in FIG. 10) wherein these fixed contacts 17', 18' are to be arranged such that the contact region 16 of the second micro-element 2 interconnects these fixed contacts 17', 18' in an electrically conducting fashion if the second micro-element 2 is located in the switch-on position B'. A changeover switch relay is thus obtained, similar to that from FIG. 5 but with only one bistable micro-element 1. The movable part 11 of the second micro-element 2 can advantageously also be constructed as two-part (similar to the embodiment in FIG. 7).

Only laterally operating MEMS were discussed in the above embodiments. However, it is also possible to construct the MEMS described (in similar form) as horizontally operating MEMS. Then DRIE is not typically used for the manufacture but rather other methods known from MEMS or semiconductor technology are used, such as those mentioned in the aforesaid patent specifications U.S. Pat. No. 5,638,946, U.S. Pat. No. 5,677,823 or DE 42 05 029 C1. The disclosure content of these patent specifications is thus hereby included in the present description.

Figure 11A:
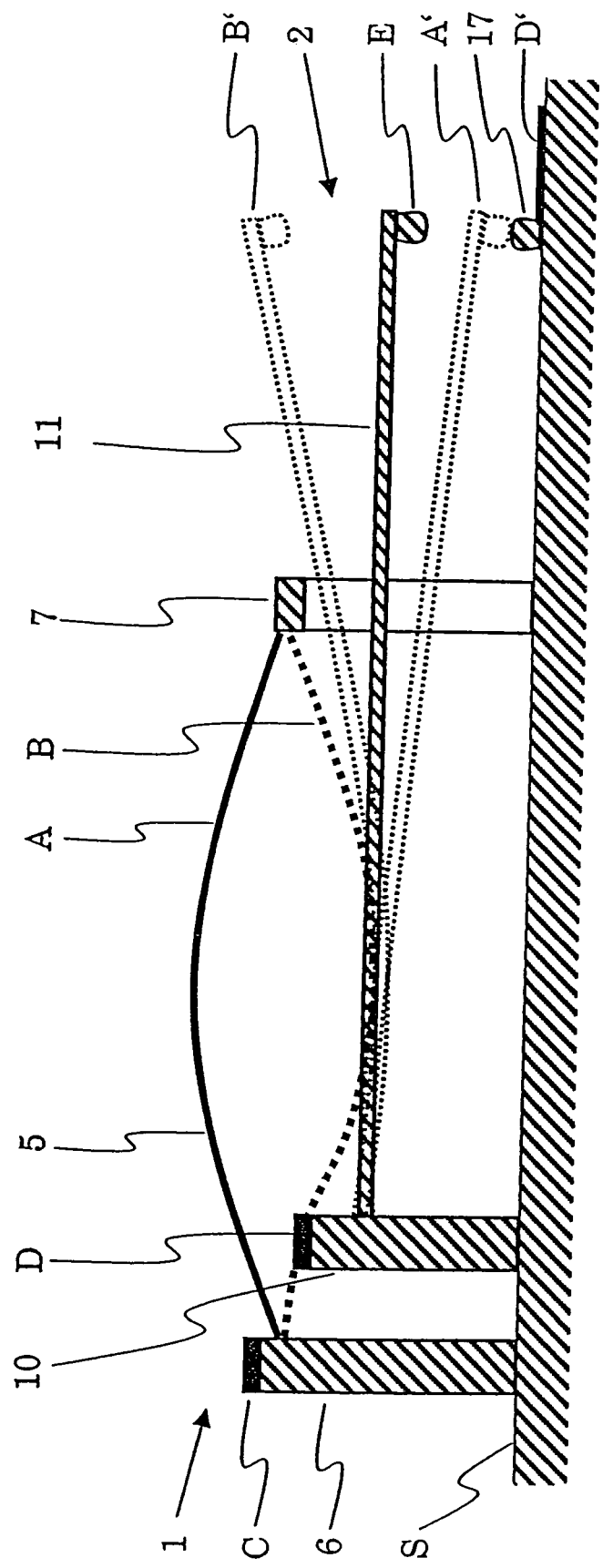
FIG. 11a is a schematic diagram of a horizontally operating microrelay according to the invention with NC connection, cutaway side view.
Figure 11B:
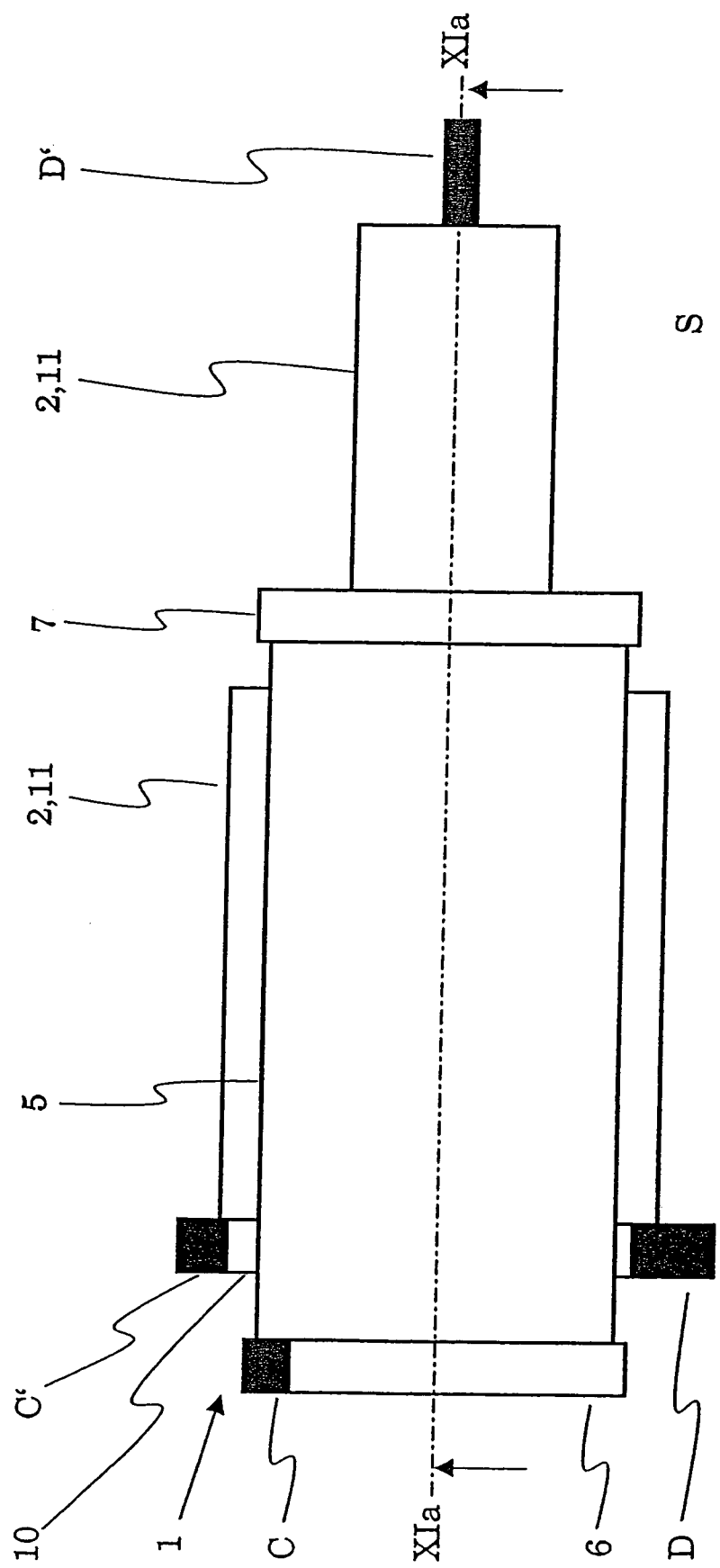
FIG. 11b is a schematic diagram of a horizontally operating microrelay according to the invention with NC connection, plan view.

FIGS. 11*a* and 11*b* show a possible exemplary embodiment in which the movable parts of the MEMS are substantially horizontally movable. FIG. 11*a* is cutaway side view of the MEMS shown in plan view in FIG. 11*b*. In FIG. 11*b* the line of the section in FIG. 11*a* is indicated by XIa—XIa. The MEMS is a micro-relay with an NC connection.

The first micro-element 1 here is constructed as an antinode-shaped bistable elastically switchable micro-element similar to the first micro-element 1 shown in FIG. 2. In the initial position A the symmetric antinode is arched away from the substrate S. The second end 7 of the first micro-element 1 is constructed here as bridge-like. As a result, the second micro-element 2 arranged below the antinode can extend to outside the region between the first end 6 and the second end 7 of the first micro-element 1. The first fixed end 10 of the second micro-element 2 is here used as a stop for the formation of the asymmetric antinode of the first micro-element 1 in the working position B.

The movable part 11 of the second micro-element 2 initially (after the structuring) runs substantially parallel to the principal surface of the substrate S. After switching the first micro-element 1 from the initial position A into the working position B, the first micro-element 1 exerts a compressive force on the movable part 11 of the second micro-element 2. The second micro-element 2 is elastically deformed. It enters into its switch-off position A' in which a movable contact electrode E fixedly attached to the movable part 11 contacts a fixed electrode 17 fixed on the substrate S. An NC connection is thereby produced between the movable contact electrode E and the fixed electrode 17. This production of an NC connection is quite similar to the method described in connection with FIGS. 10*a* to 10*c*.

If suitable switching voltages are applied between the two micro-elements 1, 2, the second micro-element 2 is transferred into the switch-on state B' in which the movable part 11 of the second micro-element 2 is bent away from the substrate and the NC connection is open. The contacting electrodes C, C' are used to apply switching voltages. Contacting electrodes D, D' are used to apply a signal to be switched. The contacting electrode D which is electrically connected to the movable contact electrode E is arranged here on the first fixed end 10 of the second micro-element 2. The contacting electrode D' electrically connected to the fixed contact 17 is arranged on the substrate S.

Other MEMS according to the invention, such as the MEMS described further above can also be implemented as horizontally operating MEMS.

An arrangement with a fixed electrode 17 and a movable contact electrode E, as in FIGS. 11*a* and 11*b* can also advantageously be implemented in the MEMS described further above, which are described with a contact region 16 and two fixed electrodes 17, 18.

In the embodiment from FIGS. 11*a, b* it is very advantageous that the distance in the open state between the movable contact electrode E of the second micro-element 2 and the fixed contact 17 can be selected and is highly reproducible in terms of production technology. The same also applies to the embodiments discussed further above provided that these are implemented similar to FIGS. 11*a, b* with a movable contact electrode E.

The MEMS according to the invention can not only be implemented as switches or relays as in the above examples. A wide range of micro-actuators can be implemented. For example, MEMS according to the invention can be micro-valves or micro-pumps or actuate such.

The substrate S used to manufacture the MEMS according to the invention is preferably constructed as flat. It typically has a principal surface which is structured to produce the MEMS, wherein the movement of the movable parts of the MEMS are movable substantially parallel or perpendicular to this principal surface. The substrate S preferably consists of a semiconductor material, especially silicon which is advantageously single-crystal and especially advantageously (for a sufficient electrical conductivity) is also doped. In the case of single-crystal silicon, advantageously no- or only very slow, relaxation is to be expected for bistably switchable micro-elements 1, 1', 2, 19, 20, 23, 24 under mechanical stress.

In particular, an SOI (silicon-on-insulator) wafer can be used consisting of three substrate-parallel layers, silicon-silicon oxide-silicon. The silicon oxide layer is used as the sacrificial layer.

The structuring method mentioned is typically a material-removing method, preferably an etching method. The LIGA technique or especially reactive ion etching and especially advantageously deep ion etching (DRIE) can be considered here. The DRIE method has the advantage of being very suitable for producing surfaces which (relative to their height perpendicular to the substrate) are closely spaced and run almost perpendicular to the principal surface of the substrate S. DRIE is well suited for the manufacture of laterally operating MEMS. However, methods which deposit material are also feasible, for example, if mutually facing faces thus produced have a minimal spacing dependent on the method. For example, there are rapid prototyping methods using photopolymerisation.

In addition to electrostatically actuatable actuators, electromagnetically or piezoelectrically actuatable actuators can also be implemented according to the invention. The actuating forces can be repulsive or attractive.

The bistably switchable micro-element according to the invention can also be tristably or otherwise multistably switchable. In addition, for some applications after the first switching from the initial position A to the working position B it is not necessary for the micro-elements 1, 1', 19, 20, 23, 24 to be switchable back to the initial position A. A single, for example, plastic deformation can also be considered. However, the micro-elements 1, 1', 19, 20, 23, 24 are preferably bistably elastically switchable and switchable back into the initial position A. It is especially advantageous if the bistable micro-elements 1, 1', 2, 19, 20, 23, 24 are constructed as the cosinusoidal or antinode-shaped micro-elements described wherein these can also be implemented in modified form and combined within an MEMS.

Depending on the purpose, the micro-elements can optionally have electrically conducting or electrically non-conducting coatings. A non-conducting coating is preferably used to prevent discharges between electrostatic electrodes in contact with one another. For example, stoppers or springs can be used as alternative or additional protection from such discharges, as are known from DE 198 00 189 A1 already cited. The contacting electrodes C, C', D, D' can be produced in a known fashion (for example, by sputtering) and can be contacted for example by bonding.

For the manufacturing process for the MEMS according to the invention it should be noted that the first switching of the first micro-element 1 and also the other bistably switchable micro-elements 1', 19, 20, 23, 24 from the initial position A to the working position B should be considered as still belonging to the MEMS manufacturing process. This initial switching process can take place mechanically. Preferably however this switching process is carried out as part of a quality or function test (burn-in) of the MEMS wherein other units connected to the substrate can be co-tested or initialised. The initial switching process can then preferably take place by producing an attractive force between the bistable micro-element 1, 1', 19, 20, 23, 24 and the second micro-element 2, wherein this force advantageously takes place by applying a switching voltage. Such a switching voltage is typically higher than a switching voltage used to switch the second micro-element 2 between switch-off position A' and switch-on position B'.

Said features can be advantageous jointly or individually or in any combination.

The linear expansion of the MEMS described is typically between 0.2 mm and 5 mm, preferably 0.8 mm to 2 mm. For DRIE as a structuring method said minimal distance (minimal groove width) is about 5 μm to 15 μm; it has a typical dependence on the depth of the structured groove. The depth of the structured groove is typically 300 μm to 550 μm. By switching from the initial position A to the working position B, the corresponding distance is reduced to typically zero or 0.1 μm to 1 μm. Layer thicknesses of the non-conducting coatings 3b, 3b', 4b. 4b' are typically 50 nm to 500 μm.

The switching voltages for the MEMS described (switching between switch-off position A' and switch-on position B') are typically 10 V to 80 V, preferably 25 V to 50 V. When the first switching of the bistable micro-elements from the initial position A to the working position takes place by electrostatic forces of attraction, switching voltages between 70 V and 300 V, preferably between 100 V and 200 V are used for this.

REFERENCE LIST

1 First micro-element
1' Third micro-element
2 Second micro-element
3 First surface (of the first micro-element);
3a facing the second surface
3a First face (of the first micro-element); facing the second face
3b First coating (of the first face)
3' Third surface (of the third micro-element); facing the fourth surface
3a' Third face (of the third micro-element); facing the fourth face
3b' Third coating (of the third face)
4 Second surface (of the second micro-element); facing the first surface
4a Second face (of the second micro-element); facing the first face
4b Second coating (of the second face)
4' Fourth surface (of the second micro-element); facing the third surface
4a' Fourth face (of the second micro-element); facing the third face
4b' Fourth coating (of the fourth face)
5 Switch section of the first micro-element
6 First end of the first micro-element
7 Second end of the first micro-element
8 Centre between the first and the second end of the first micro-element
9 (Matched) electrode of the first micro-element
10 First fixed end of the second micro-element
10' Second fixed end of the second micro-element
11 Movable part of the second micro-element
12 Gap-forming surface
13 Gap
14 First region of the movable part of the second micro-element
15 Second region of the movable part of the second micro-element
16,16' Contact region of the movable part of the second micro-element
17,18 Fixed contacts
17',18' Fixed contacts
19 Fourth micro-element
20 Fifth micro-element
21,22 Contact electrodes
23 Sixth micro-element
24 Seventh micro-element
25a Fifth face (of the sixth micro-element); facing the sixth face
25a' Seventh face (of the seventh micro-element); facing the eighth face
26a Sixth face (of the second micro-element); facing the fifth face
26a' Eighth face (of the second micro-element); facing the fifth face
A Initial position
B Working position
A' Switch-off position (of the second micro-element)
B' Switch-on position (of the second micro-element)
C,C' Contacting electrodes
D,D' Contacting electrodes
E Movable contacting electrodes (of the second micro-element)
S Substrate

The invention claimed is:

1. A micro-electromechanical system, comprising a substrate as well as a first micro-element and a second micro-element, wherein (a) the first micro-element and the second micro-element are connected to the substrate and (b) the first micro-element has a first face and the second micro-element has a second face, which faces face one another and are produced by a structuring method, wherein (d) the first micro-element contains a switch section by which it is bistably switchable between an initial position and a working position, and (e) the distance between the first face and the second face in the working position of the first micro-element is smaller than a minimal distance producible by the structuring method between the first face and the second face.

2. The micro-electromechanical system according to claim 1, wherein (a) the first micro-element has a first surface which is the same as the first face or, if the first face is provided with a first coating, is the same as the surface of this coating and (b) the second micro-element has a second surface which is the same as the second face or, if the second face is provided with a second coating, is the same as the surface of this coating.

3. The micro-electromechanical system according to claim 2, wherein (a) the second micro-element has a first fixed end fixedly connected to the substrate and a movable part, wherein (b) the first surface and the second surface are electrically non-conducting and (c) the first surface and the second surface have contact points in the working position and (d) the second micro-element is thereby switchable from a switch-off position to a switch-on position, that in the working position of the first micro-element the movable part of the second micro-element is movable by electrostatic forces between the first micro-element and the second micro-element.

4. The micro-electromechanical system according to claim 3, wherein (a) the first micro-element comprises an electrode, which electrode contains the first surface and (b) the electrode and the second micro-element are constructed such that in the switch-on position of the second micro-element the first surface and the second surface are in full-area contact.

5. The micro-electromechanical system according to claim 4, wherein the electrode has a gap-forming surface which is constructed such that it is set back in a step fashion with respect to the first surface and with the second micro-element encloses a gap when the first micro-element is in the working position and the second micro-element is in the switch-on position.

6. The micro-electromechanical system according to claim 3, wherein the movable part of the second micro-element has a first region and a second region, wherein the first region is arranged between the second region and the first fixed end of the second micro-element, comprises a part of the second surface and is constructed as less stiff than the second region.

7. The micro-electromechanical system according to claim 3, wherein (a) the micro-electromechanical system has two fixed contacts fixedly connected to the substrate, and (b) the movable part of the second micro-element has an electrically conductive contact region, which contact region is arranged in the area of the end of the second micro-element opposite to the first fixed end of the second micro-element, and through which contact region in the switch-on position of the second micro-element the two fixed contacts are interconnected in a conducting fashion.

8. The micro-electromechanical system according to claim 7, wherein (a) the micro-electromechanical system comprises a third micro-element which is bistably switchable, which is connected to the substrate and which is arranged in a region which lies on the side of the second micro-element facing away from the first micro-element and (b) that the micro-electromechanical system has two further fixed contacts which further fixed contacts are fixedly connected to the substrate and are arranged in a region which lies on the side of the second microelement facing away from the fixed contacts, (c) that the movable part of the second micro-element has a further electrically conductive contact region which is arranged in the area of an end of the second micro-element opposite to the first fixed end of the second micro-element, on the side of the second micro-element facing away from the contact region, and (d) wherein the third micro-element interacts with the second micro-element and with the further fixed contacts in a fashion similar to that in which the first micro-element interacts with the second micro-element and with the fixed contacts.

9. The micro-electromechanical system according to claim 6 wherein the contact region is arranged in the second region of the movable part of the second micro-element.

10. The micro-electromechanical system according to claim 1, wherein (a) the micro-electromechanical system comprises a third micro-element which is connected to the substrate and has a third face, (b) the second micro-element contains a switch section which has a first fixed end fixedly connected to the substrate, a second fixed end fixedly connected to the substrate, a movable part arranged between these two fixed ends and a fourth face and (c) through which switch section the second micro-element is switchable between a switch-off position and a switch-on position, wherein (d) the movable part of the second micro-element comprises an electrically conductive contact region, (e) the second face is arranged between the first fixed end and the contact region, and (f) the fourth face is arranged between the second fixed end and the contact region, (g) the third face and the fourth face are produced by the structuring method and are facing one another, and (h) the third micro-element contains a switch section through which it is bistably switchable between an initial position and a working position, and (i) the distance between the third surface and the fourth face in the working position of the third micro-element is smaller than a minimal distance producible by the structuring method between the third face and the fourth face.

11. The micro-electromechanical system according to claim 10, wherein
(a) the third micro-element has a third surface which is the same as the third face or, if the third face is provided with a third coating, is the same as the surface of this coating, and
(b) the second micro-element has a fourth face which is the same as the fourth face or, if the fourth face is provided with a fourth coating, is the same as the surface of this coating.

12. The micro-electromechanical system according to claim 11, wherein
(a) the micro-electromechanical system contains two fixed contacts fixedly connected to the substrate,
(b) the second micro-element is thereby switchable from its initial position into its switch-on position, that in the working position of the first micro-element and of the third micro-element the movable part of the second micro-element is elastically movable by electrostatic forces between the first microelement and the second micro-element and between the third micro-element and the second micro-element, and
(c) in the switch-on position of the second micro-element the two fixed contacts are interconnected by the contact region in a conducting fashion.

13. The micro-electromechanical system according to claim 12, wherein
(a) the micro-electromechanical system comprises
a fourth micro-element and
a fifth micro-element
(b) which micro-elements
are connected to the substrate in an area which lies on the side of the second micro-element facing away from the fixed contacts,
contains switch sections through which they are bistably switchable between an initial position and a working position, and
which each have a contact electrode provided with an electrically conductive coating, and
(c) in the switch-off position of the second micro-element in the working position of the fourth microelement and the fifth micro-element the two contact electrodes are interconnected by the contact region in an electrically conducting fashion.

14. The micro-electromechanical system according to claim 10, wherein the second micro-element is bistably elastically switchable between its initial position and its switch-on position.

15. The micro-electromechanical system according to claim 14, wherein
(a) the micro-electromechanical system comprises
a sixth micro-element and
a seventh micro-element,
(b) which micro-elements
are connected to the substrate,
are arranged on the side of the second micro-element which is facing away from the second surface and the fourth surface,
contain switch sections through which they are bistably switchable between an initial position (A) and a working position,
(c) the sixth micro-element has a fifth face,
(d) the second micro-element has a sixth face which is arranged on the side of the second micro-element facing away from the second surface between the first fixed end and the contact region,
(e) the fifth face and the sixth face are facing one another and are produced by the structuring method,
(f) the seventh micro-element has a seventh face,
(g) the second micro-element has an eighth face which is arranged on the side of the second micro-element facing away from the fourth surface between the second fixed end and the contact region,
(h) the seventh face and the eighth face are facing one another and produced by the structuring method, and
(i) the distance between the fifth face and the sixth face in the working position of the sixth micro-element is smaller than a minimal distance producible by the structuring method between the fifth face and the sixth face, and
(i) the distance between the seventh face and the eighth face in the working position of the seventh micro-element is smaller than a minimal distance producible by the structuring method between the seventh face and the eighth face and
(j) the second micro-element is thereby switchable from its switch-on position into its switch-off position, that in the working position of the sixth micro-element and the seventh micro-element the movable part the second micro-element is elastically movable by electrostatic forces between the sixth micro-element and the second micro-element and between the seventh micro-element and the second micro-element.

16. The micro-electromechanical system according to claim 14, wherein
(a) the substrate is constructed as a flat extensive solid with a principal surface, and
(b) the micro-elements are constructed as regular prismatic bodies whose base surfaces are aligned parallel to the principal surface, wherein
(c) the movable part of the second micro-element
is constructed as a regular prismatic body and
is laterally movable and
(d) the base surface of the regular prismatic body forming the movable part either
has the form of a symmetrical antinode in the switch-off position and
has the form of an asymmetric antinode in the switch-on position,
or
describes two parallel cosinusoidal lines which are interconnected at the centre between their two ends.

17. The micro-electromechanical system according to claim 1, wherein
(a) the substrate is constructed as a flat extensive body with a principal surface and
(b) each micro-element is constructed as regular prismatic bodies whose base surfaces are aligned parallel to the principal surface, wherein
(c) there is at least one micro-element bistably switchable between an initial position and a working position, whose switch section contains
a first fixed end fixedly connected to the substrate,
a second fixed end fixedly connected to the substrate and
a movable part arranged between these two fixed ends,
(d) which movable part
is constructed as a regular prismatic body and
is laterally movable and
(e) the base surface of the regular prismatic body forming the movable part either has the form of a symmetrical antinode in the switch-off position and has the form of an asymmetric antinode in the switch-on position, or describes two parallel cosinusoidal lines which are interconnected at the centre between their two ends.

18. The micro-electromechanical system according to claim 3, wherein the movable part of the second micro-element is elastically deformable from the initial position A to the working position A by switching the first micro-element.

19. The micro-electromechanical system according to claim 18, wherein (a) the micro-electromechanical system has two fixed contacts fixedly connected to the substrate and (b) that the movable part of the second micro-element has an electrically conductive contact region, which contact region is arranged in the area of an end of the second micro-element opposite to the first fixed end of the second micro-element and through which contact region in the switch-off position of the second-microelement the two fixed contacts are interconnected in a conducting fashion.

20. The micro-electromechanical system according to claim 1, wherein (a) the substrate is constructed as a flat extensive body with a principal surface, characterised in (b) the switch section of the first micro-element is horizontally movable and (c) the movable part of the second micro-element is horizontally movable.

21. A method for manufacturing a micro-electromechanical system in which method (a) a first micro-element connected to the substrate is produced from a substrate and (b) a second micro-element connected to the substrate is produced from a substrate, and (c) using a structuring method, a first face of the first micro-element and a second face of the second micro-element are formed which faces face one another and are at a distance from one another, wherein (d) the first micro-element is formed such that it is located in an initial position, it is bistably switchable from the initial position into a working position and the distance of the first face from the second face in the working position is smaller that a minimal distance producible by the structuring method between the first face and the second face and (e) after forming the first face and the second face by the structuring method, the first micro-element is switched into the working position.

22. The method of manufacture according to claim 21, wherein before switching the first micro-element into the working position, the first face of the first micro-element is provided with a first electrically conducting or electrically non-conducting coating, and/or the second face of the second micro-element is provided with a second electrically conducting or electrically non-conducting coating.

23. The method of manufacture according to claim 21, wherein a resulting micro-electro mechanism system comprises a substrate as well as a first micro-element and a second micro-element, wherein (a) the first micro-element and the second micro-element are connected to the substrate and (b) the first micro-element has a first face and the second micro-element has a second face, which faces face one another and are produced by a structuring method, wherein (d) the first micro-element contains a switch section by which it is bistably switchable between an initial position and a working position, and (e) the distance between the first face and the second surface in the working position of the first micro-element is smaller than a minimal distance producible by the structuring method between the first face and the second face.

* * * * *